(12) United States Patent
Hisada et al.

(10) Patent No.: US 7,742,851 B2
(45) Date of Patent: *Jun. 22, 2010

(54) ELECTRICALLY OPERATED VEHICLE DRIVE CONTROLLER, ELECTRICALLY OPERATED VEHICLE DRIVE CONTROL METHOD AND ITS PROGRAM

(75) Inventors: Hideki Hisada, Aichi-ken (JP); Masaki Nomura, Aichi-ken (JP); Toshio Okoshi, Aichi-ken (JP)

(73) Assignee: Aisin AW Co., Ltd., Aichi-ken (JP)

( * ) Notice: Subject to any disclaimer, the term of this patent is extended or adjusted under 35 U.S.C. 154(b) by 1309 days.

This patent is subject to a terminal disclaimer.

(21) Appl. No.: 11/070,219

(22) Filed: Mar. 3, 2005

(65) Prior Publication Data

US 2005/0203679 A1    Sep. 15, 2005

(30) Foreign Application Priority Data

Mar. 12, 2004    (JP)    ............... 2004-070903

(51) Int. Cl.
    B60L 11/02    (2006.01)
(52) U.S. Cl. ............... 701/22; 180/65.1; 180/65.21; 180/65.31
(58) Field of Classification Search ............... 701/1, 701/22, 84, 87; 180/65.1, 65.2, 65.3; 477/3, 477/7; 290/40 A, 40 B, 40 C; 700/41, 42, 700/43, 45
See application file for complete search history.

(56) References Cited

U.S. PATENT DOCUMENTS 5,294,871 A * 3/1994 Imaseki ............... 318/139
6,260,644 B1 * 7/2001 Otsu ............... 180/65.3
7,010,400 B2 * 3/2006 Hisada et al. ............... 701/22
7,353,094 B2 * 4/2008 Okoshi et al. ............... 701/22

FOREIGN PATENT DOCUMENTS

| JP | 9-170533 A | 6/1997 |
| JP | 2000-087777 | * 3/2000 |
| JP | 2000-87777 A | 3/2000 |

OTHER PUBLICATIONS

JP 2004-070903 Notification of Reasons for Refusal, Written Argument and Written Amendment.*
JP 2004-070904 Notification of Reasons for Refusal and Written Amendment.*
JP 2000-087777 Translation.*
JP 2000-324615 Translation.*
JP 9048334 Translation.*

* cited by examiner

*Primary Examiner*—Thomas G Black
*Assistant Examiner*—Ce Li
(74) *Attorney, Agent, or Firm*—Sughrue Mion, PLLC

(57) ABSTRACT

An apparatus and a method to stably run an electrically operated vehicle is disclosed. The invention has an electric generator target torque calculation processor for calculating electric generator target torque showing a target value of electric generator torque by feedback control for performing at least integral control; a determination processor for calculating an integral term correction determining value on the basis of an integral term component of the electric generator target torque in the integral control; and a drive motor target torque calculation processor for calculating drive motor target torque showing a target value of drive motor torque on the basis of the integral term correction determining value. Since the drive motor target torque is calculated on the basis of the integral term correction determining value, no error is generated in the drive motor target torque and the electrically operated vehicle is stably run.

3 Claims, 13 Drawing Sheets

ELECTRICALLY OPERATED VEHICLE DRIVE CONTROLLER, ELECTRICALLY OPERATED VEHICLE DRIVE CONTROL METHOD AND ITS PROGRAM

BACKGROUND OF THE INVENTION

This application claims priority of Japanese Patent Application No. 2004-070903, filed on Mar. 12, 2004, in the Japan Patent Office, the disclosure of which is incorporated in its entirety by reference.

1. Field of the Invention

The present invention relates to an electrically operated vehicle drive controller, an electrically operated vehicle drive control method and its program.

2. Background Art

A planetary gear unit having a sun gear, a ring gear and a carrier is conventionally arranged in a vehicle drive unit mounted to a hybrid type vehicle as an electrically operated vehicle and transmitting one portion of the engine torque as torque of an engine to an electric generator (electric generator motor) and transmitting the remaining engine torque to a drive wheel. The above sun gear and the electric generator are connected to each other. The ring gear, a drive motor and the drive wheel are connected to each other. The carrier and the engine are connected to each other. Driving force is generated by transmitting the rotation outputted from the above ring gear and the drive motor to the drive wheel.

In the hybrid type vehicle of this kind, when the engine is driven in accordance with an engine target rotating speed that is a target value of the engine rotating speed as the rotating speed of the engine, the engine torque becomes ring gear torque as torque of the ring gear and appears in the ring gear, and is transmitted to the drive wheel. An insufficient amount of the ring gear torque with respect to torque required to run the hybrid type vehicle, i.e., vehicle request torque, is compensated by drive motor torque as torque of the drive motor.

Therefore, electric generator torque as torque of the electric generator is calculated on the basis of the above engine target rotating speed. Electric generator target torque that is a target value of the electric generator torque is converted into a value on the ring gear and the ring gear torque is calculated. This ring gear torque is further converted into a value on the output shaft of the drive motor, and the drive shaft torque is determined. On the other hand, the above vehicle request torque is converted into a value on the output shaft of the drive motor, and output shaft request torque is determined. The difference between this output shaft request torque and the drive shaft torque is set to drive motor target torque that is a target value of the drive motor torque.

In this case, when the ring gear torque is calculated on the basis of the electric generator target torque and the drive shaft torque is determined, the influence of inertia torque as torque of an inertia (inertia of a rotor and a rotor shaft) amount of the electric generator at a changing time of the electric generator torque appears in the ring gear torque. Therefore, the ring gear torque is calculated by expecting the inertia torque, and the drive shaft torque is determined.

However, in the above conventional vehicle drive unit, an angular acceleration of the electric generator is required to calculate the inertia torque of the electric generator. However, it is necessary to differentiate the rotor position of the electric generator detected by a resolver twice to calculate this angular acceleration. When a periodic change is generated in the rotor position by the characteristics of the resolver, dispersion is generated with respect to the calculated angular acceleration so that an error is generated in the inertia torque of the electric generator.

Accordingly, an error is also generated in the drive shaft torque determined on the basis of the inertia torque, and an error is further generated in the drive motor target torque. Accordingly, it is impossible to stably run the hybrid type vehicle.

Therefore, sending the angular acceleration to a limiter and removing an excessively large value and an excessively small value by this limiter has been considered. However, this dispersion of the angular acceleration can not be removed and the vehicle drive unit can not be stably operated.

SUMMARY OF THE INVENTION

An aspect of the present invention is to provide an electrically operated vehicle drive controller, an electrically operated vehicle drive control method and its program able to stably run the electrically operated vehicle by solving the above problems of the conventional vehicle drive unit.

Therefore, an electrically operated vehicle drive controller of the present invention comprises electric generator target torque calculation processing means for calculating electric generator target torque that is a target value of electric generator torque by feedback control for performing at least integral control; determination processing means for calculating an integral term correction determining value on the basis of an integral term component of the electric generator target torque in the integral control; and drive motor target torque calculation processing means for calculating drive motor target torque that is a target value of drive motor torque on the basis of the integral term correction determining value.

In another electrically operated vehicle drive controller of the present invention, the electric generator target torque calculation processing means further calculates the electric generator target torque on the basis of the speed deviation between an electric generator rotating speed detected by a rotating speed detecting section and an electric generator target rotating speed that is a target value of the electric generator rotating speed.

In still another electrically operated vehicle drive controller of the present invention, the electric generator target torque is further calculated by adding at least a proportional term component proportional to the speed deviation, and an integral term component proportional to an integral value of the speed deviation.

Still another electrically operated vehicle drive controller of the present invention further comprises a differential rotating device in which first to third differential elements are arranged and the first differential element is mechanically connected to the electric generator and the second differential element is mechanically connected to the drive motor and the third differential element is mechanically connected to an engine.

The above drive motor target torque is calculated on the basis of an output required by a driver and the electric generator target torque.

In an electrically operated vehicle drive control method of the present invention, electric generator target torque that is a target value of electric generator torque is calculated by feedback control for performing at least integral control, and an integral term correction determining value is calculated on the basis of an integral term component of the electric generator target torque in the integral control, and drive motor target torque that is a target value of drive motor torque is calculated on the basis of the integral term correction determining value.

In a program of the electrically operated vehicle drive control method of the present invention, a computer functions as electric generator target torque calculation processing means for calculating electric generator target torque that is a target value of electric generator torque by feedback control for performing at least integral control; determination processing means for calculating an integral term correction determining value on the basis of an integral term component of the electric generator target torque in the integral control; and drive motor target torque calculation processing means for calculating drive motor target torque that is a target value of drive motor torque on the basis of the integral term correction determining value.

In accordance with the present invention, the electrically operated vehicle drive controller comprises the electric generator target torque calculation processing means for calculating electric generator target torque that is a target value of electric generator torque by feedback control for performing at least integral control; the determination processing means for calculating an integral term correction determining value on the basis of an integral term component of the electric generator target torque in the integral control; and the drive motor target torque calculation processing means for calculating drive motor target torque that is a target value of drive motor torque on the basis of the integral term correction determining value.

In this case, since the drive motor target torque is calculated on the basis of the integral term correction determining value, no error is generated in the drive motor target torque and it is possible to stably run the electrically operated vehicle.

BRIEF DESCRIPTION OF THE DRAWINGS

The above and other features and aspects of the present invention will become more apparent by describing in detail exemplary embodiments thereof with reference to the attached drawings in which.

DESCRIPTION OF THE EXEMPLARY EMBODIMENTS

The embodiments of the present invention will next be explained in detail with reference to the drawings. In this case, the hybrid type vehicle as an electrically operated vehicle will be explained.

Figure 2:
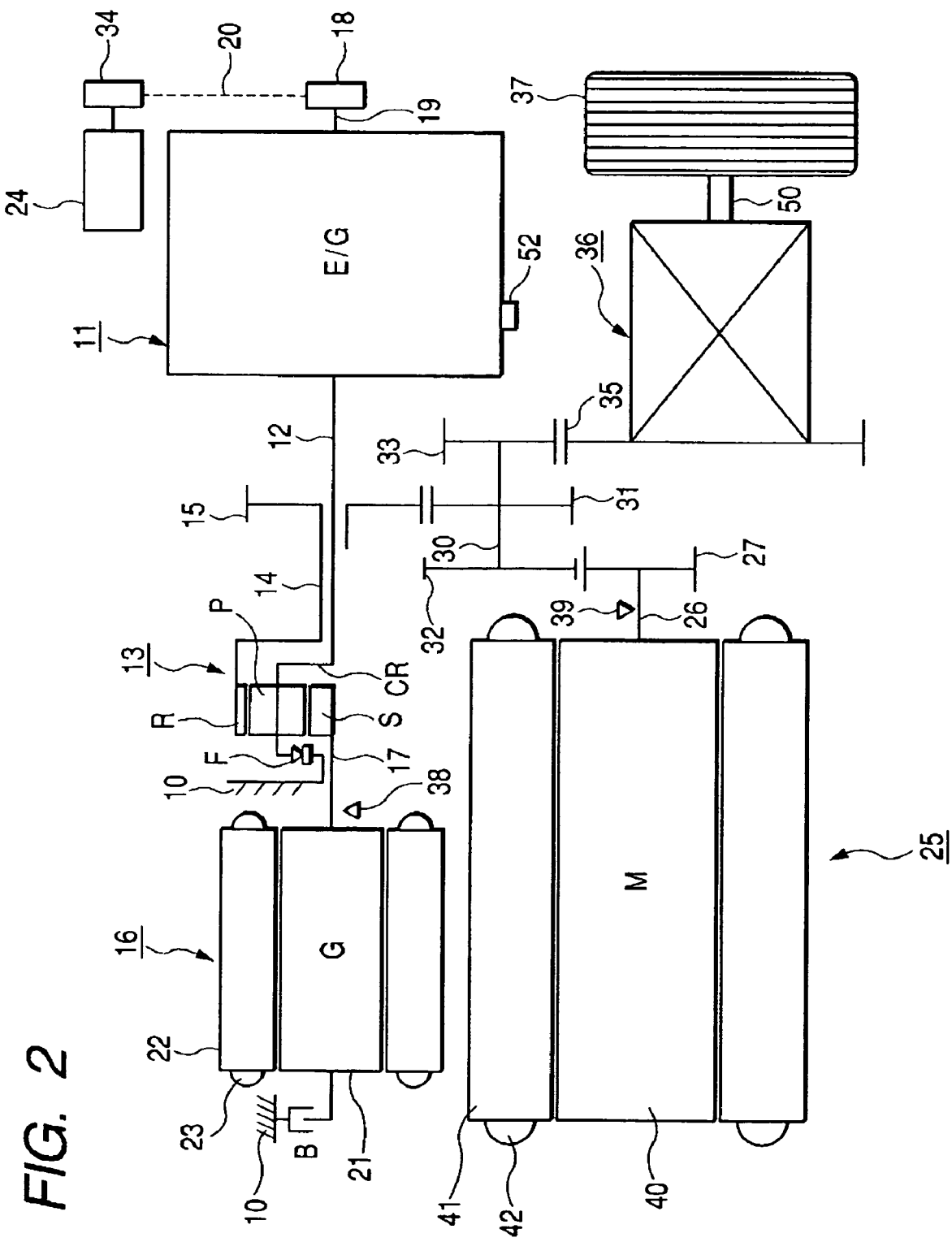
FIG. 2 is a conceptual view of a hybrid type vehicle in the embodiment of the present invention.

FIG. 2 is a conceptual view of the hybrid type vehicle in an embodiment of the present invention.

In this figure, reference numerals 11 and 12 respectively designate an engine (E/G) arranged on a first axis, and an output shaft arranged on this first axis and outputting rotation generated by driving this engine 11. This output shaft 12 is connected to a crank shaft 19 of the engine 11. Reference numeral 13 designates a planetary gear unit as a differential rotating device arranged on the above first axis and which changes speeds with respect to the rotation inputted through the above output shaft 12. Reference numeral 14 designates an output shaft arranged on the above first axis and the rotation after the speed change in the above planetary gear unit 13 is outputted to this output shaft 14. Reference numeral 15 designates a first counter drive gear as an output gear fixed to the output shaft 14. Reference numeral 16 designates an electric generator (G) as a first electrically operated machine arranged on the above first axis and connected to the above planetary gear unit 13 through a transmission shaft 17 and mechanically connected to the engine 11 so as to be differentially freely rotated. The above engine 11 and the electric generator 16 are mechanically connected to a drive wheel 37 as a vehicle wheel.

The above output shaft 14 has a sleeve shape and is arranged so as to surround the above output shaft 12. Further, the above first counter drive gear 15 is arranged on the engine 11 side from the planetary gear unit 13.

The above planetary gear unit 13 has at least a sun gear S as a first differential element, a pinion P engaged with this sun gear S, a ring gear R as a second differential element engaged with this pinion P, and a carrier CR as a third differential element for rotatably supporting the above pinion P. The above sun gear S is connected to the electric generator 16 through the above transmission shaft 17. The ring gear R is arranged on a second axis parallel to the above first axis through the output shaft 14 and a predetermined gear series, and is connected to a drive motor (M) 25 and a drive wheel 37 as a second electrically operated machine mechanically connected to the above engine 11 and the electric generator 16 so as to be differentially freely rotated. The carrier CR is connected to the engine 11 through the output shaft 12. The above drive motor 25 is mechanically connected to the drive wheel 37.

Further, a one-way clutch F is arranged between the above carrier CR and a case 10 of a vehicle drive unit. This one-way clutch F becomes free when the rotation of the positive direction is transmitted from the engine 11 to the carrier CR. When the rotation of the reverse direction is transmitted from the electric generator 16 or the drive motor 25 to the carrier CR, this one-way clutch F is locked so that the rotation of the engine 11 is stopped and the rotation in the reverse direction is not transmitted to the engine 11. Accordingly, when the electric generator 16 is operated in the stopping state of the driving of the engine 11, reaction force is applied to torque transmitted from the electric generator 16 by the above one-way clutch F. A brake as a stopping means can be also arranged instead of the one-way clutch F between the above carrier CR and the case 10.

The above electric generator 16 is constructed by a rotor 21 fixed to the above transmission shaft 17 and rotatably arranged, a stator 22 arranged around this rotor 21, and a coil 23 wound around this stator 22. The above electric generator 16 generates electric power by the rotation transmitted through the transmission shaft 17. The above coil 23 is connected to a battery and supplies a direct electric current to this battery. An electric generator brake B is arranged between the above rotor 21 and the above case 10. The rotor 21 is fixed by engaging the electric generator brake B and the rotation of the electric generator 16 can be mechanically stopped.

Reference numeral 26 designates an output shaft arranged on the above second axis, and the rotation of the above drive motor 25 is outputted to this output shaft 26. Reference numeral 27 designates a second counter drive gear as an output gear fixed to this output shaft 26. The above drive motor 25 is constructed by a rotor 40 fixed to the above output shaft 26 and rotatably arranged, a stator 41 arranged around this rotor 40, and a coil 42 wound around this stator 41.

The above drive motor 25 generates drive motor torque TM by the electric currents of U-phase, V-phase and W-phase as alternating electric currents supplied to the coil 42. Therefore, the above coil 42 is connected to the above battery, and the direct electric current from this battery is converted into the electric current of each phase and is supplied to the above coil 42.

A counter shaft 30 is arranged on a third axis parallel to the above first and second axes to rotate the above drive wheel 37 in the same direction as the rotation of the engine 11. A first counter driven gear 31 and a second counter driven gear 32 having a tooth number larger than that of this first counter driven gear 31 are fixed to this counter shaft 30. The above first counter driven gear 31 and the above first counter drive gear 15 are engaged with each other. Further, the above second counter driven gear 32 and the above second counter drive gear 27 are engaged with each other. The rotation of the above first counter drive gear 15 is inverted and transmitted to the first counter driven gear 31. The rotation of the above second counter drive gear 27 is inverted and transmitted to the second counter driven gear 32.

Further, a diff pinion gear 33 having a tooth number smaller than that of the above first counter driven gear 31 is fixed to the above counter shaft 30.

A differential device 36 is arranged on a fourth axis parallel to the above first to third axes. A diff ring gear 35 of this differential device 36 and the above diff pinion gear 33 are engaged with each other. Accordingly, rotation transmitted to the diff ring gear 35 is distributed by the above differential device 36 and is transmitted to the drive wheel 37 through a drive shaft 50. Thus, the rotation generated by the engine 11 can be transmitted to the first counter driven gear 31, and the rotation generated by the drive motor 25 can be also transmitted to the second counter driven gear 32. Accordingly, it is possible to run the hybrid type vehicle by driving the engine 11 and the drive motor 25.

An air conditioner as an auxiliary machine is arranged in the above hybrid type vehicle, and this air conditioner can be operated by driving a motor 24 for an air conditioner as a driving section for an air conditioner. Therefore, a drive pulley 18 as a rotating body of the driving side is attached to the above crank shaft 19, and a driven pulley 34 as a rotating body of the driven side is attached to the output shaft of the motor 24 for an air conditioner. A belt 20 as a rotation transmitting member is extended and arranged between the drive pulley 18 and the driven pulley 34. An electromagnetic clutch as an engagement-disengagement member is arranged between the above motor 24 for an air conditioner and the driven pulley 34. The air conditioner can be operated and stopped by operating and stopping the above motor 24 for an air conditioner by engaging and disengaging this electromagnetic clutch.

Reference numeral 38 designates a rotor position sensor such as a resolver, etc., as a first position detecting section for detecting a rotor position $\theta G$ as the position of the rotor 21. Reference numeral 39 designates a rotor position sensor such as a resolver, etc., as a second position detecting section for detecting a rotor position $\theta M$ as the position of the rotor 40. The detected rotor position $\theta G$ is sent to a vehicle controller and an electric generator controller. The rotor position $\theta M$ is sent to the vehicle controller and a drive motor controller. Reference numeral 52 designates an engine rotating speed sensor as an engine rotating speed detecting section for detecting an engine rotating speed NE. The engine rotating speed NE is sent to the vehicle controller and an engine controller.

The operation of the above planetary gear unit 13 will next be explained.

Figure 3:
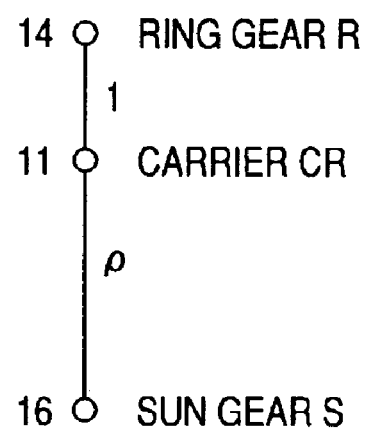
FIG. 3 is a view for explaining the operation of a planetary gear unit in the embodiment of the present invention.
Figure 4:
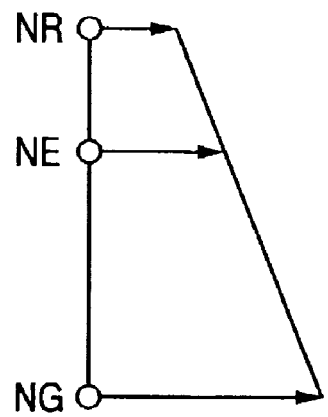
FIG. 4 is a vehicle speed diagram at a normal running time in the embodiment of the present invention.
Figure 5:
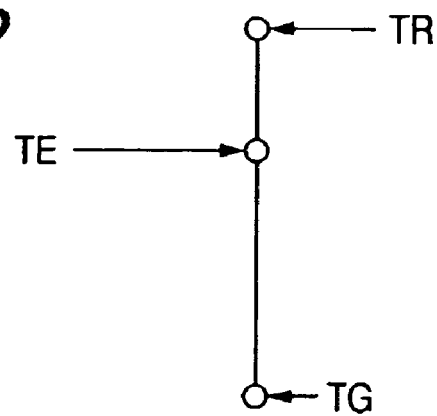
FIG. 5 is a torque diagram at the normal running time in the embodiment of the present invention.

FIG. 3 is a view for explaining the operation of the planetary gear unit in the embodiment of the present invention. FIG. 4 is a vehicle speed diagram at a normal running time in the embodiment of the present invention. FIG. 5 is a torque diagram at the normal running time in the embodiment of the present invention.

In the above planetary gear unit 13 (FIG. 2), the carrier CR is connected to the engine 11, and the sun gear S is connected to the electric generator 16. The ring gear R is connected to the above drive motor 25 and the drive wheel 37 through the output shaft 14 and a predetermined gear series, respectively. Accordingly, a ring gear rotating speed NR as the rotating speed of the ring gear R and an output shaft rotating speed as the rotating speed outputted to the output shaft 14 are equal to each other. A carrier rotating speed as the rotating speed of the carrier CR and the engine rotating speed NE are equal to each other. A sun gear rotating speed as the rotating speed of the sun gear S and an electric generator rotating speed NG as the rotating speed of the electric generator 16 are equal to each other. When the tooth number of the ring gear R is set to $\rho$ times (twice in this embodiment) the tooth number of the sun gear S, the relation of $$(\rho+1)\cdot NE = 1\cdot NG + \rho\cdot NR \qquad \text{[EQN. 1]}$$

is formed. Accordingly, the engine rotating speed NE $$NE = (1\cdot NG + \rho\cdot NR)/(\rho+1) \qquad \text{[EQN. 2]}$$

can be calculated on the basis of the ring gear rotating speed NR and the electric generator rotating speed NG. The rotating speed relation equation of the planetary gear unit 13 is constructed by the above EQN. 2.

The relation of $$TE:TR:TG=(\rho+1):\rho:1 \quad \text{[EQN. 3]}$$

is formed with respect to the engine torque TE, the ring gear torque TR and the electric generator torque TG, and reaction forces are applied to each other. The torque relation equation of the planetary gear unit 13 is constructed by the above EQN. 3.

At the time of normal running of the hybrid type vehicle, each of the ring gear R, the carrier CR and the sun gear S is rotated in the positive direction. As shown in FIG. 4, each of the ring gear rotating speed NR, the engine rotating speed NE and the electric generator rotating speed NG has a positive value. The above ring gear torque TR and the electric generator torque TG are obtained by proportionally dividing the engine torque TE in a torque ratio determined by the tooth number of the planetary gear unit 13. Accordingly, in the torque diagram shown in FIG. 5, torque obtained by adding the ring gear torque TR and the electric generator torque TG becomes the engine torque TE.

The electrically operated vehicle drive controller for controlling the operation of the above vehicle drive unit will next be explained.

Figure 6:
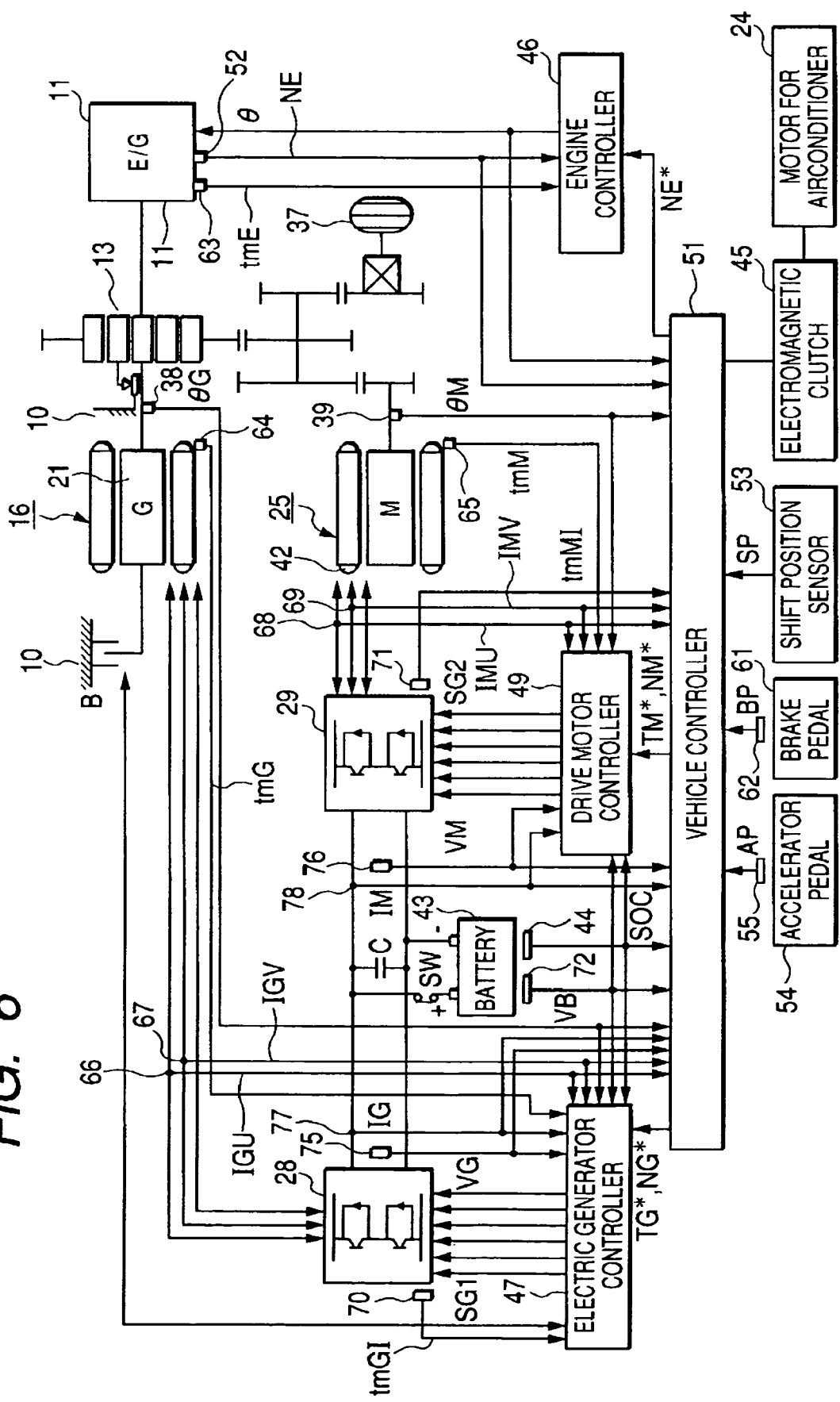
FIG. 6 is a conceptual view of an electrically operated vehicle drive controller in the embodiment of the present invention.

FIG. 6 is a conceptual view of the electrically operated vehicle drive controller in the embodiment of the present invention.

In this figure, reference numerals 10, 11 and 13 respectively designate the case, the engine (E/G) and the planetary gear unit. Reference numerals 16, B and 25 respectively designate the electric generator (G), an electric generator brake for fixing the rotor 21 of the electric generator 16, and the drive motor (M). Reference numerals 28, 29 and 37 respectively designate an inverter as an electric generator inverter for operating the above electric generator 16, an inverter as a drive motor inverter for driving the above drive motor 25, and the drive wheel. Reference numerals 38, 39 designate the rotor position sensors for detecting rotor positions θG, θM. Reference numeral 43 designates the battery.

The above inverters 28, 29 are connected to the battery 43 through a power switch SW. This battery 43 supplies a direct electric current to the above inverters 28, 29 when the above power switch SW is turned on. Each of the above inverters 28, 29 has plural transistors, e.g., six transistors as switching elements. Each transistor is in a unit pair constituting a transistor module (IGBT) of each phase.

An electric generator inverter voltage sensor 75 as a first direct current voltage detecting section is arranged on the inlet side of the above inverter 28 to detect an electric generator inverter voltage VG as a direct current voltage applied to the inverter 28. An electric generator inverter electric current sensor 77 as a first direct electric current detecting section is arranged on the inlet side of the above inverter 28 to detect an electric generator inverter electric current IG as a direct electric current supplied to the inverter 28. A drive motor inverter voltage sensor 76 as a second direct current voltage detecting section is arranged on the inlet side of the above inverter 29 to detect a drive motor inverter voltage VM as a direct current voltage applied to the inverter 29. A drive motor inverter electric current sensor 78 as a second direct electric current detecting section is arranged on the inlet side of the above inverter 29 to detect a drive motor inverter electric current IM as a direct electric current supplied to the inverter 29. The above electric generator inverter voltage VG and the electric generator inverter electric current IG are sent to a vehicle controller 51 and an electric generator controller 47. The drive motor inverter voltage VM and the drive motor inverter electric current IM are sent to the vehicle controller 51 and a drive motor controller 49. A capacitor C for smoothing signals is connected between the above battery 43 and the inverters 28, 29.

Further, the above vehicle controller 51 is constructed by CPU, recorder, etc., and controls the entire operation of the vehicle drive unit. An engine controller 46, the electric generator controller 47 and the drive motor controller 49 are connected to the above vehicle controller 51. The above engine controller 46 is constructed by CPU, recorder, etc., and sends instruction signals of a throttle aperture θ, valve timing, etc. to the engine 11 and the vehicle controller 51 to control the operation of the engine 11. The above electric generator controller 47 is constructed by CPU, recorder, etc., and sends a driving signal SG1 to the inverter 28 to control the operation of the above electric generator 16. The drive motor controller 49 is constructed by CPU, recorder, etc., and sends a driving signal SG2 to the inverter 29 to control the operation of the above drive motor 25. A first controller located in a lower position from the vehicle controller 51 is constructed by the above engine controller 46, the electric generator controller 47 and the drive motor controller 49. A second controller located in an upper position from the engine controller 46, the electric generator controller 47 and the drive motor controller 49 is constructed by the above vehicle controller 51. Further, the above vehicle controller 51, the above engine controller 46, the electric generator controller 47 and the drive motor controller 49 function as a computer in accordance with predetermined program, data, etc.

The above inverter 28 is operated in accordance with the driving signal SG1. At a power applying time, the inverter 28 receives the direct electric current from the battery 43 and generates electric currents IGU, IGV, IGW of the respective phases, and supplies the electric currents IGU, IGV, IGW of the respective phases to the electric generator 16. At a regenerative time, the inverter 28 receives the electric currents IGU, IGV, IGW of the respective phases from the electric generator 16, and generates and supplies the direct electric current to the battery 43.

The above inverter 29 is operated in accordance with the driving signal SG2. At the power applying time, the inverter 29 receives the direct electric current from the battery 43 and generates electric currents IMU, IMV, IMW of the respective phases, and supplies the electric currents IMU, IMV, IMW of the respective phases to the drive motor 25. At the regenerative time, the inverter 29 receives the electric currents IMU, IMV, IMW of the respective phases from the drive motor 25 and generates and supplies the direct electric current to the battery 43.

Reference numeral 44 designates a battery remaining amount detector for detecting a state of the above battery 43, i.e., a battery remaining amount SOC as the battery state. Reference numeral 45 designates an electromagnetic clutch for operating and stopping the motor 24 for an air conditioner. Reference numeral 52 designates an engine rotating speed sensor for detecting the engine rotating speed NE. Reference numeral 53 designates a shift position sensor for detecting the position of a shift lever as a selecting speed operation means, i.e., a shift position SP. Reference numeral 54 designates an accelerator pedal. Reference numeral 55 designates an accelerator switch as an accelerator operation detecting section for detecting an accelerator pedal position AP as the position (stepping-in amount) of the accelerator pedal 54. Reference numeral 61 designates a brake pedal. Reference numeral 62 designates a brake switch as a brake operation detecting section for detecting a brake pedal position BP as the position (stepping-in amount) of the brake pedal 61. Reference numeral 63 designates an engine temperature sensor for detecting the temperature tmE of the engine 11. Reference numeral 64 designates an electric generator temperature sensor for detecting the temperature of the electric generator 16, e.g., the temperature tmG of the coil 23 (FIG. 2). Reference numeral 65 designates a drive motor temperature sensor for detecting the temperature of the drive motor 25, e.g., the temperature tmM of the coil 42. Reference numeral 70 designates a first inverter temperature sensor for detecting the temperature tmGI of the inverter 28. Reference numeral 71 designates a second inverter temperature sensor for detecting the temperature tmMI of the inverter 29.

Further, reference numerals 66 to 69 designate electric current sensors as an electric current detecting section for detecting the electric currents IGU, IGV, IMU, IMV of the respective phases. Reference numeral 72 designates a battery voltage sensor as a voltage detecting section for the battery 43 for detecting a battery voltage VB as the above battery state. The above battery voltage VB and the battery remaining amount SOC are sent to the electric generator controller 47, the drive motor controller 49 and the vehicle controller 51. A battery electric current, battery temperature, etc., can be also detected as the battery state. A battery state detecting section is constructed by the battery remaining amount detector 44, the battery voltage sensor 72, a battery electric current sensor, a battery temperature sensor, etc. Further, the electric currents IGU, IGV are sent to the electric generator controller 47 and the vehicle controller 51. The electric currents IMU, IMV are sent to the drive motor controller 49 and the vehicle controller 51.

The vehicle controller 51 sends an engine control signal to the above engine controller 46, and sets the starting and the stoppage of the engine 11 by the engine controller 46. A vehicle speed calculation processing means of the above vehicle controller 51 performs vehicle speed calculation processing and calculates a change $\Delta\theta M$ of the rotor position $\theta M$ and also calculates the vehicle speed V on the basis of this change $\Delta\theta M$ and a gear ratio $\gamma V$ in a torque transmission system from the above output shaft 26 to the drive wheel 37.

The vehicle controller 51 then sets an engine target rotating speed NE*, electric generator target torque TG*, drive motor target torque TM*, an electric generator target rotating speed NG* that is a target value of the electric generator rotating speed NG, a drive motor target rotating speed NM* that is a target value of the drive motor rotating speed NM as the rotating speed of the drive motor 25, etc.

Further, a air conditioner operation processing means of the vehicle controller 51 performs air conditioner operation processing. When a predetermined air conditioner operating condition exists, the air conditioner operation processing means generates an electromagnetic clutch engaging request and engages an electromagnetic clutch 45. When the predetermined air conditioner operating condition does not exist, the air conditioner operation processing means generates an electromagnetic clutch releasing request and releases the electromagnetic clutch 45.

A first rotating speed calculation processing means of the above electric generator controller 47 performs first rotating speed calculation processing, and reads the above rotor position $\theta G$ and calculates the above electric generator rotating speed NG by calculating a change $\Delta\theta G$ by differentiating the rotor position $\theta G$. A first angular acceleration calculation processing means of the electric generator controller 47 performs first angular acceleration calculation processing and calculates an angular acceleration $\alpha G$ by further differentiating the above change $\Delta\theta G$.

A second rotating speed calculation processing means of the above drive motor controller 49 performs second rotating speed calculation processing and reads the above rotor position $\theta M$ and calculates the drive motor rotating speed NM by calculating the change $\Delta\theta M$ by differentiating the rotor position $\theta M$. A second angular acceleration calculation processing means of the above drive motor controller 49 performs second angular acceleration calculation processing and calculates an angular acceleration $\alpha M$ by further differentiating the above change $\Delta\theta M$.

The above rotor position $\theta G$ and the electric generator rotating speed NG are proportional to each other. The rotor position $\theta M$, the drive motor rotating speed NM and the vehicle speed V are proportional to each other. Accordingly, the rotor position sensor 38 and the above first rotating speed calculation processing means can be also set to function as an electric generator rotating speed detecting section as a first rotating speed detecting section for detecting the electric generator rotating speed NG. The rotor position sensor 39 and the above second rotating speed calculation processing means can be also set to function as a drive motor rotating speed detecting section as a second rotating speed detecting section for detecting the drive motor rotating speed NM. The rotor position sensor 39 and the above vehicle speed calculation processing means can be also set to function as a vehicle speed detecting section for detecting the vehicle speed V.

The operation of the electrically operated vehicle drive controller of the above construction will next be explained.

Figure 1:
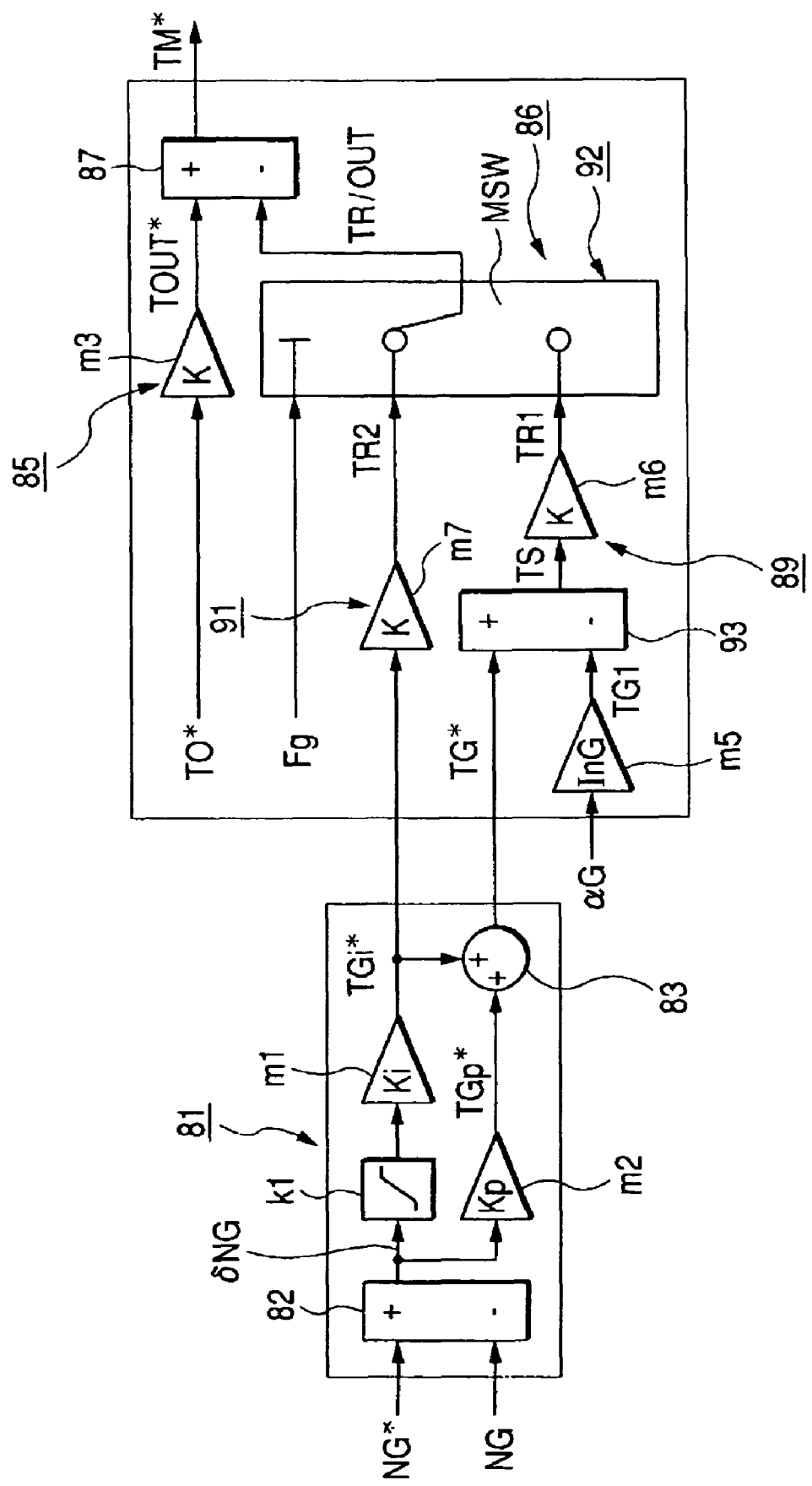
FIG. 1 is a block diagram showing a PI control processing section and a drive motor target torque calculation processing section in an embodiment of the present invention.
Figure 7:
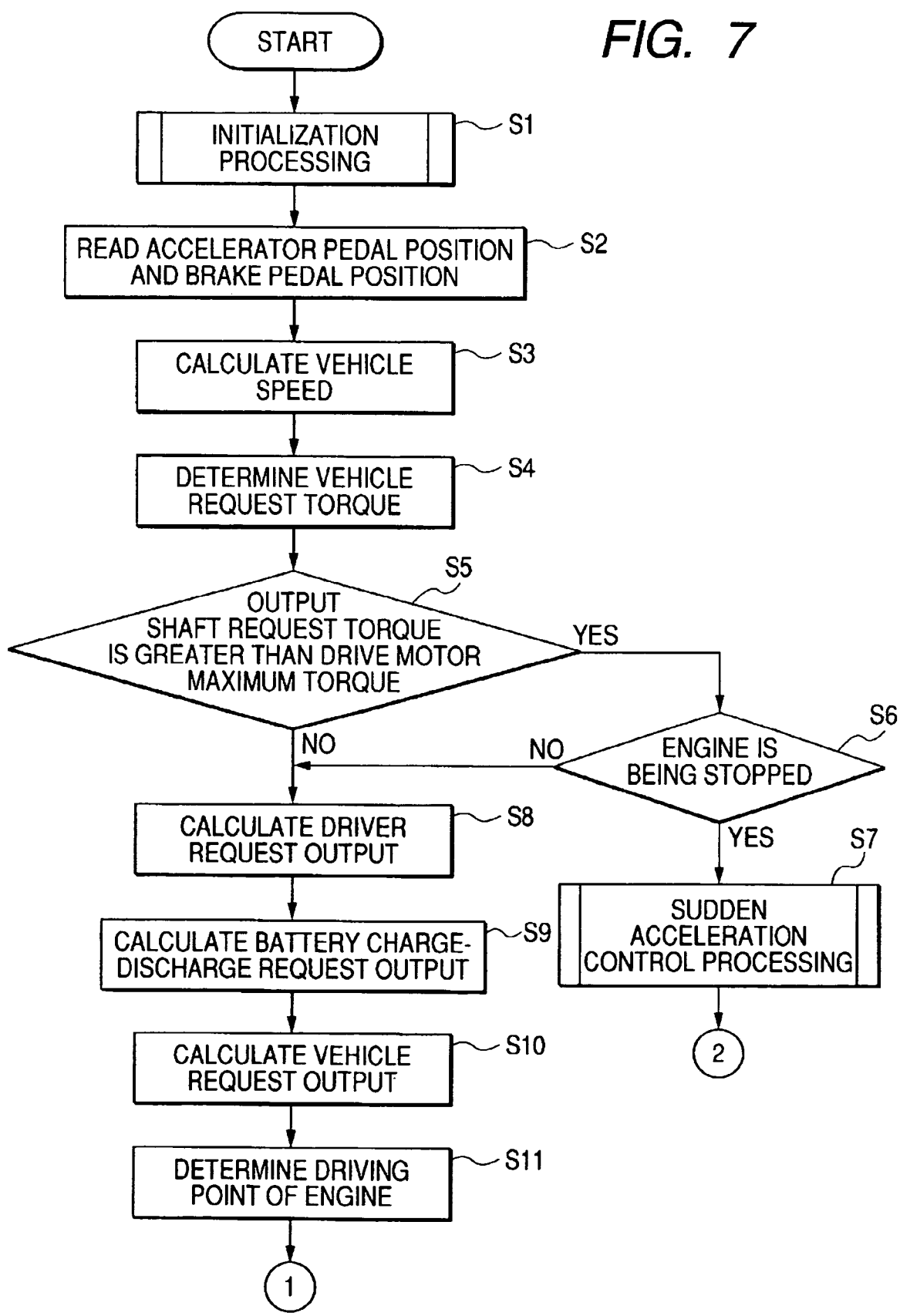
FIG. 7 is a first main flow chart showing the operation of the electrically operated vehicle drive controller in the embodiment of the present invention.
Figure 8:
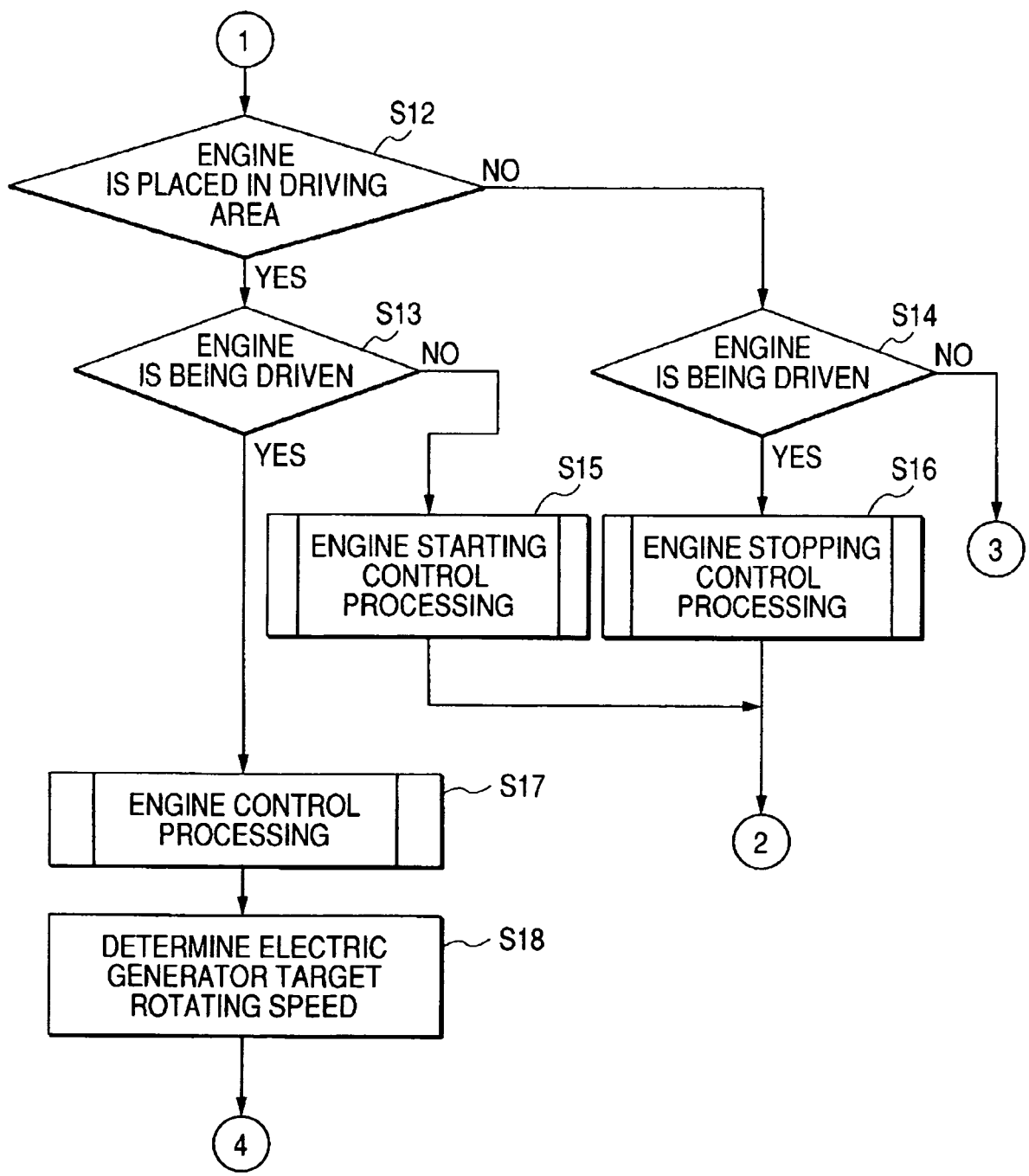
FIG. 8 is a second main flow chart showing the operation of the electrically operated vehicle drive controller in the embodiment of the present invention.
Figure 9:
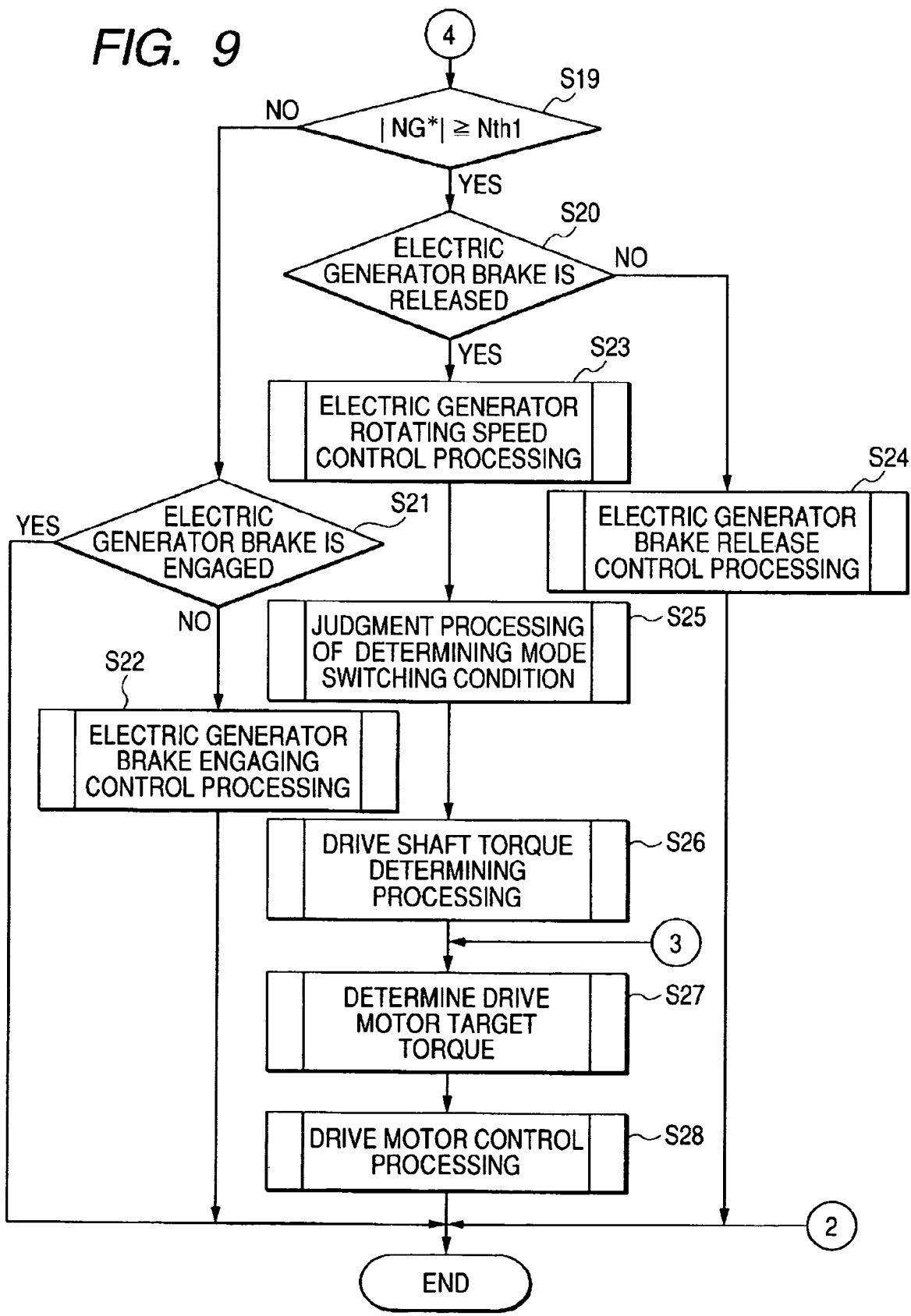
FIG. 9 is a third main flow chart showing the operation of the electrically operated vehicle drive controller in the embodiment of the present invention.
Figure 10:
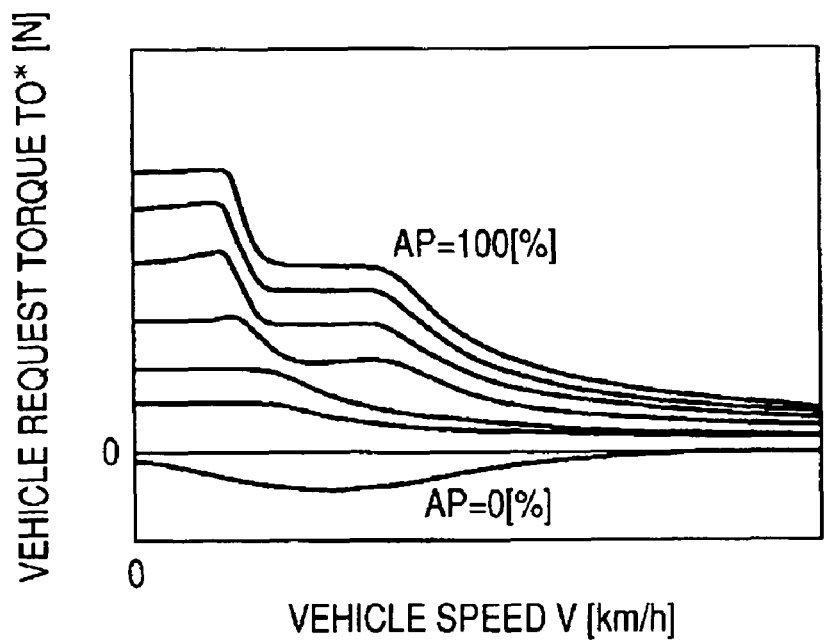
FIG. 10 is a view showing a first vehicle request torque map in the embodiment of the present invention.
Figure 11:
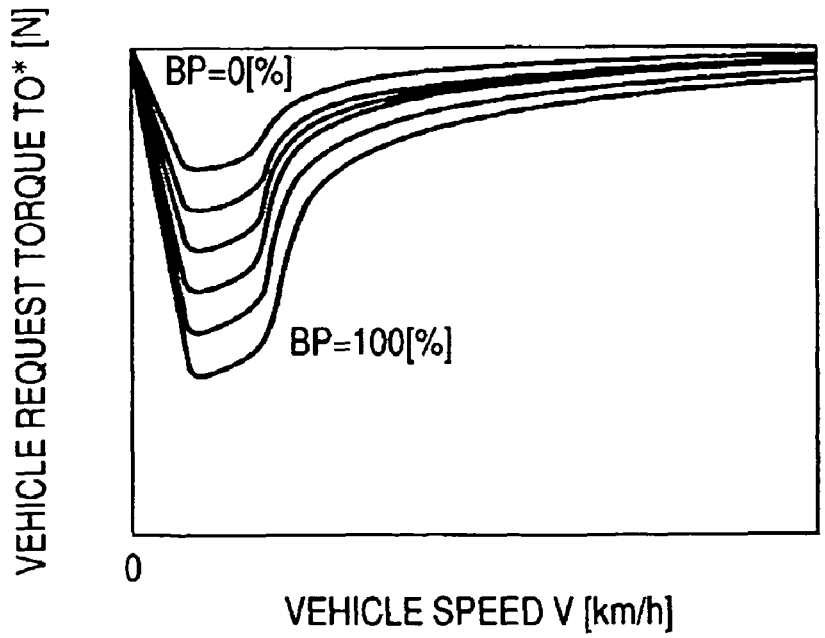
FIG. 11 is a view showing a second vehicle request torque map in the embodiment of the present invention.
Figure 12:
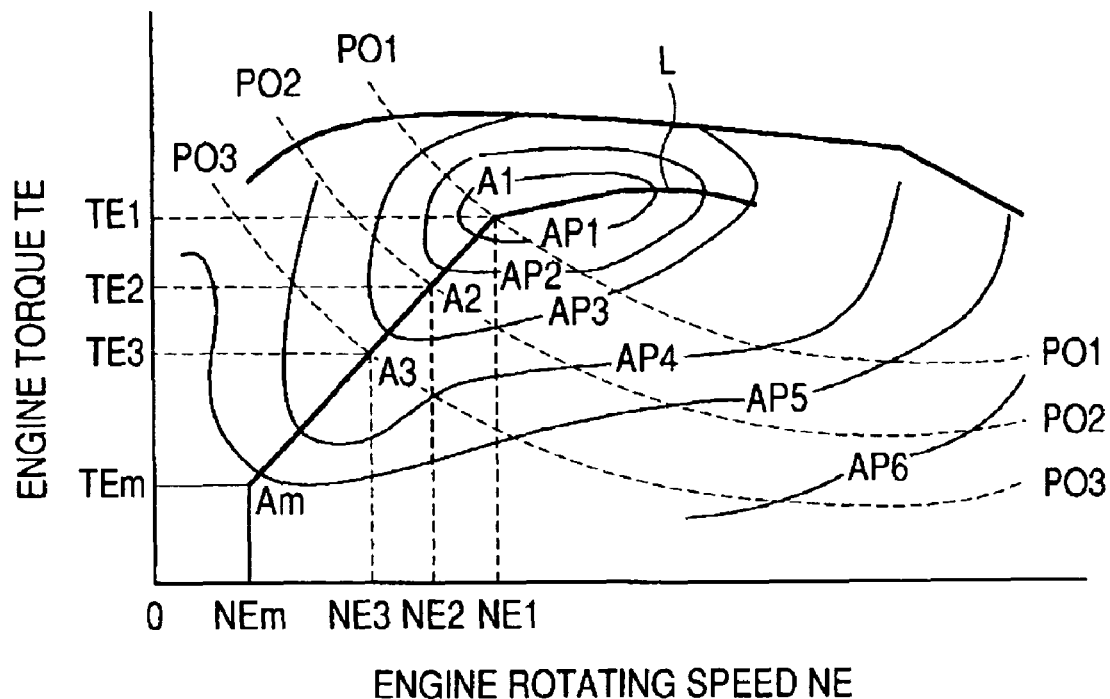
FIG. 12 is a view showing an engine target operating state map in the embodiment of the present invention.
Figure 13:
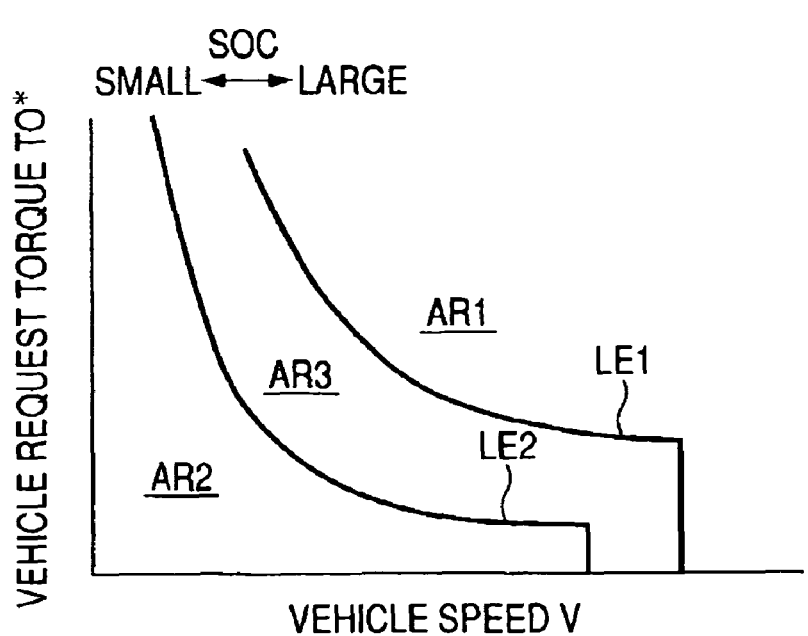
FIG. 13 is a view showing an engine driving area map in the embodiment of the present invention.
Figure 14:
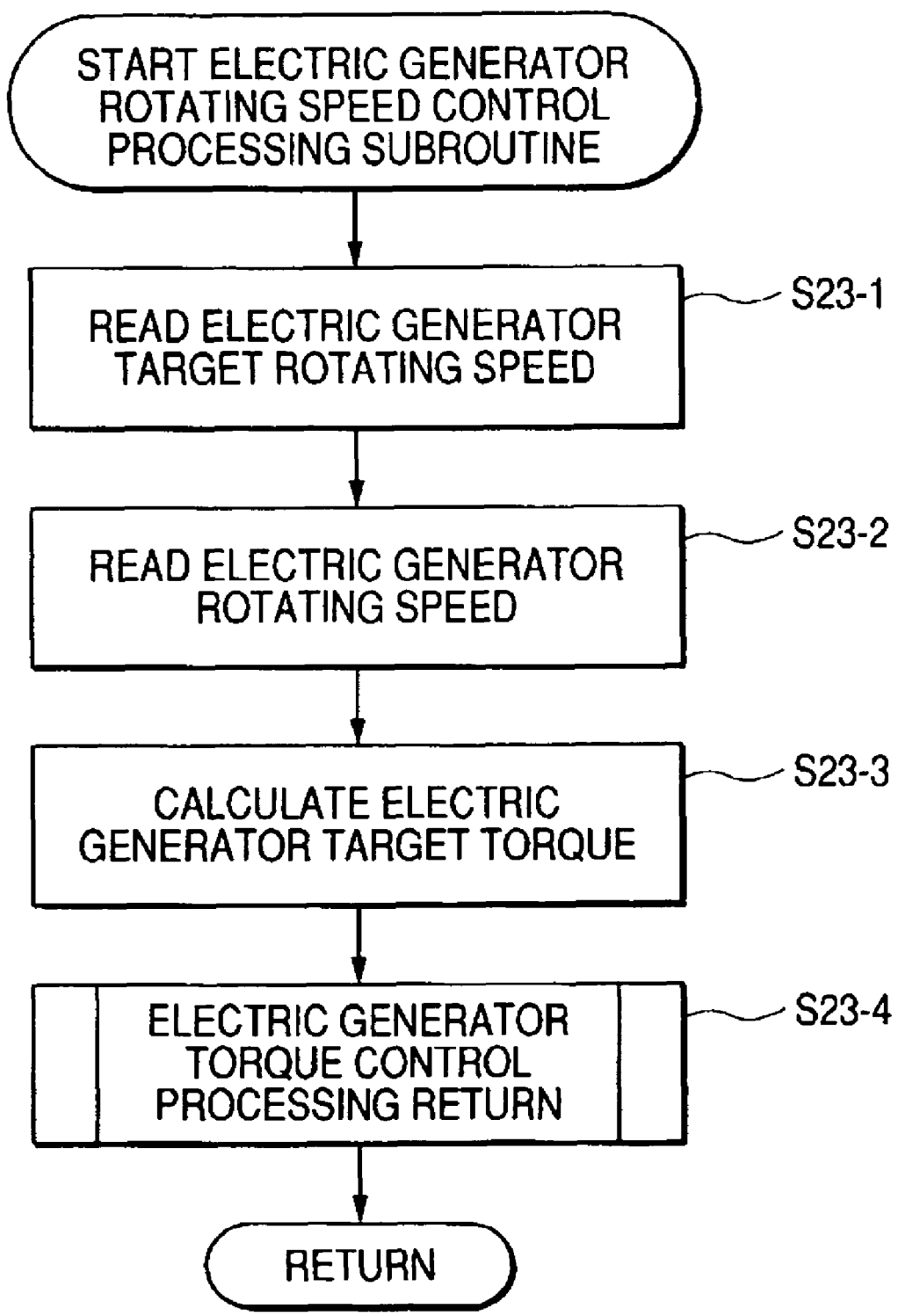
FIG. 14 is a view showing a subroutine of electric generator rotating speed control processing in the embodiment of the present invention.
Figure 15:
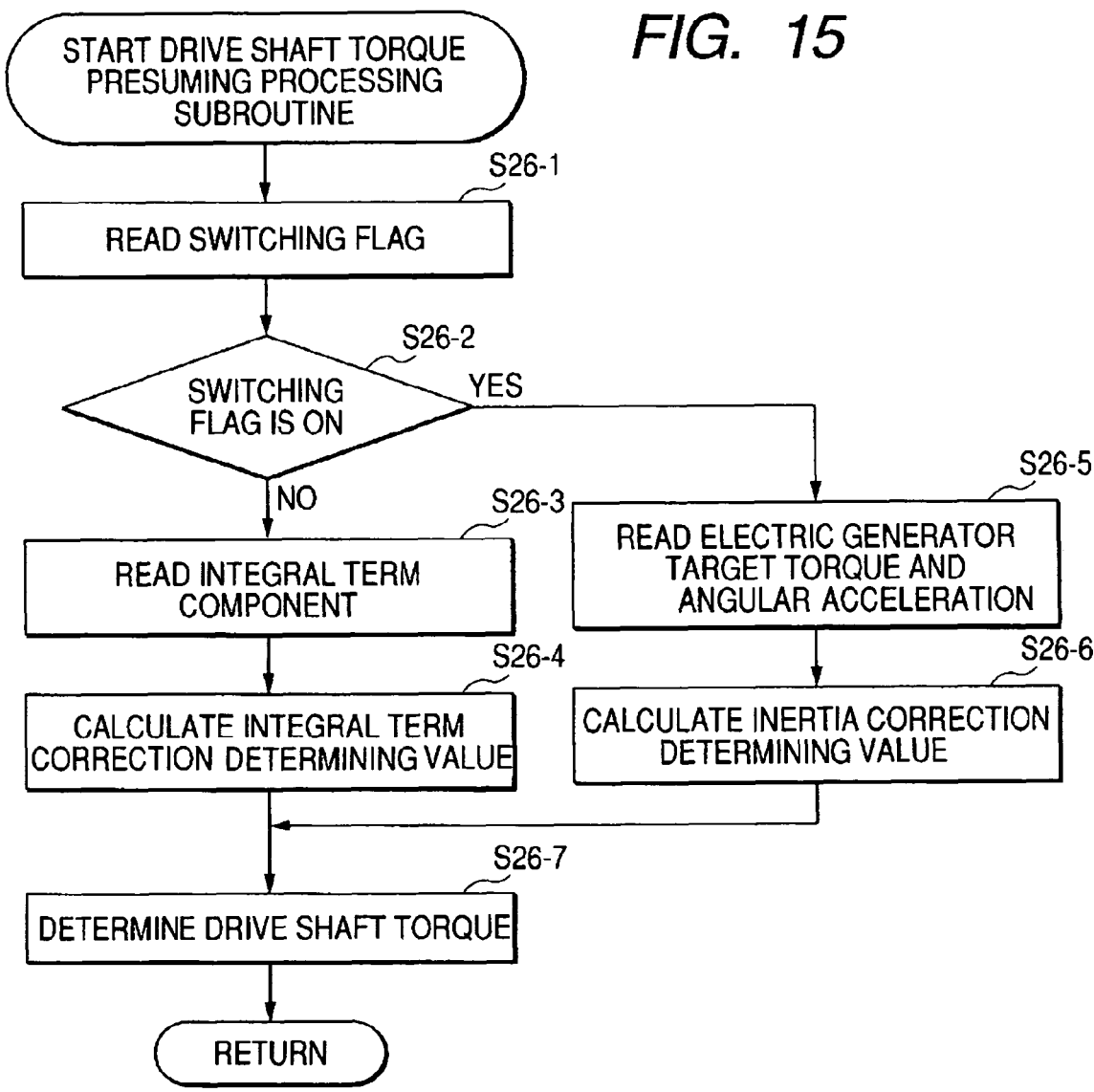
FIG. 15 is a view showing a subroutine of drive shaft torque determination processing in the embodiment of the present invention.

FIG. 1 is a block diagram showing a PI control processing section and a drive motor target torque calculation processing section in the embodiment of the present invention. FIG. 7 is a first main flow chart showing the operation of the electrically operated vehicle drive controller in the embodiment of the present invention. FIG. 8 is a second main flow chart showing the operation of the electrically operated vehicle drive controller in the embodiment of the present invention. FIG. 9 is a third main flow chart showing the operation of the electrically operated vehicle drive controller in the embodiment of the present invention. FIG. 10 is a view showing a first vehicle request torque map in the embodiment of the present invention. FIG. 11 is a view showing a second vehicle request torque map in the embodiment of the present invention. FIG. 12 is a view showing an engine target operating state map in the embodiment of the present invention. FIG. 13 is a view showing an engine driving area map in the embodiment of the present invention. FIG. 14 is a view showing a subroutine of electric generator rotating speed control processing in the embodiment of the present invention. FIG. 15 is a view showing a subroutine of drive shaft torque determination processing in the embodiment of the present invention. In FIGS. 10, 11 and 13, the vehicle speed V is set on the axis of abscissa, and vehicle request torque TO* is set on the axis of ordinate. In FIG. 12, the engine rotating speed NE is set on the axis of abscissa and the engine torque TE is set on the axis of ordinate.

An initialization processing means of the vehicle controller 51 (FIG. 6) first sets various kinds of variables to initial values by performing initialization processing. Next, a vehicle request torque determination processing means of the above vehicle controller 51 performs vehicle request torque determination processing and reads the accelerator pedal position AP from the accelerator switch 55 and also reads the brake pedal position BP from the brake switch 62. The above vehicle speed calculation processing means reads the rotor position θM and calculates the change ΔθM of the rotor position θM and also calculates the vehicle speed V on the basis of the change ΔθM and the above gear ratio γV.

Subsequently, when the accelerator pedal 54 is stepped in, the above vehicle request torque determination processing means refers to the first vehicle request torque map of FIG. 10 recorded to the recorder of the above vehicle controller 51. When the brake pedal 61 is stepped in, the above vehicle request torque determination processing means refers to the second vehicle request torque map of FIG. 11 recorded to the above recorder. The vehicle request torque determination processing means then determines vehicle request torque TO* on the drive shaft 50 (FIG. 2) required to run the hybrid type vehicle and set in advance correspondingly to the accelerator pedal position AP, the brake pedal position BP and the vehicle speed V.

Next, a vehicle request torque judgment processing means of the above vehicle controller 51 performs vehicle request torque judgment processing and converts the vehicle request torque TO* into output shaft request torque TOUT* as torque on the output shaft 26 on the basis of the gear ratio from the drive shaft 50 to the output shaft 26. The vehicle request torque judgment processing means then judges whether this output shaft request torque TOUT* is greater than drive motor maximum torque TMmax that is a maximum value of the drive motor torque TM. When the above output shaft request torque TOUT* is greater than the drive motor maximum torque TMmax, the above vehicle controller 51 judges whether the operation of the engine 11 has stopped. When the operation of the engine 11 has stopped, a sudden acceleration control processing means of the vehicle controller 51 performs sudden acceleration control processing, and runs the hybrid type vehicle by driving the drive motor 25 and the electric generator 16.

In contrast to this, when the output shaft request torque TOUT* is the drive motor maximum torque TMmax or less and the output shaft request torque TOUT* is greater than the drive motor maximum torque TMmax and the operation of the engine 11 is not stopped, a driver request output calculation processing means of the above vehicle controller 51 performs driver request output calculation processing and calculates a driver request output PD as an output required by the driver $$PD=TO^* \cdot V \quad [\text{EQN. 4}]$$

by multiplying the above vehicle request torque TO* and the vehicle speed V.

Next, a battery charge-discharge request output calculation processing means of the above vehicle controller 51 performs battery charge-discharge request output calculation processing and reads the battery remaining amount SOC from the above battery remaining amount detector 44 and calculates a battery charge-discharge request output PB on the basis of this battery remaining amount SOC.

Subsequently, a vehicle request output calculation processing means of the above vehicle controller 51 performs vehicle request output calculation processing and calculates a vehicle request output PO $$PO=PD+PB \quad [\text{EQN. 5}]$$

by adding the above driver request output PD and the battery charge-discharge request output PB.

Next, an engine target operating state setting processing means of the above vehicle controller 51 performs engine target operating state setting processing. With reference to the engine target operating state map of FIG. 12 recorded to the recorder of the above vehicle controller 51, the engine target operating state setting processing means determines crossing points A1 to A3, Am of lines PO1, PO2,—that is the above vehicle request output PO and an optimum fuel cost curve L highest in efficiency of the engine 11 in each of accelerator pedal positions AP1 to AP6 as operating points of the engine 11 as an engine target operating state. The engine target operating state setting processing means also determines engine torques TE1 to TE3, TEm at these operating points as engine target torque TE* that is a target value of the engine torque TE. The engine target operating state setting processing means further determines engine rotating speeds NE1 to NE3, NEm at the above operating points as the engine target rotating speed NE* and sends this engine target rotating speed NE* to the engine controller 46.

A driving judgment processing means of the above vehicle controller 51 performs driving judgment processing and judges whether the engine 11 is located in a driving area AR1 with reference to the engine driving area map of FIG. 13 recorded to the above recorder of the vehicle controller 51. In FIG. 13, AR1 shows the driving area for driving the engine 11, and AR2 shows a stopping area for stopping the driving of the engine 11, and AR3 shows a hysteresis area. Further, LE1 shows a line for driving the stopped engine 11, and LE2 shows a line for stopping the driving of the driven engine 11. As the battery remaining amount SOC is increased, the above line LE1 is moved rightward in FIG. 13 and the driving area AR1 is narrowed. In contrast to this, as the battery remaining amount SOC is reduced, the above line LE1 is moved leftward in FIG. 13 and the driving area AR1 is widened.

When the engine 11 is located in the driving area AR1 but the engine 11 is not driven, an engine starting control processing means of the vehicle controller 51 performs engine starting control processing and generates and sends an engine starting request to the engine controller 46 and starts the engine 11. When the engine 11 is not located in the driving area AR1 but the engine 11 is driven, an engine stopping control processing means of the vehicle controller 51 performs engine stopping control processing and generates and sends an engine stopping request to the engine controller 46 and stops the driving of the engine 11. When the engine 11 is not located in the driving area AR1 and the engine 11 is not driven, a drive motor target torque calculation processing means of the above vehicle controller 51 performs drive motor target torque calculation processing and calculates and determines the above output shaft request torque TOUT* as drive motor target torque TM*, and sends this drive motor target torque TM* to the drive motor controller 49. A drive motor control processing means of the vehicle controller 51 then performs drive motor control processing and controls the torque of the drive motor 25.

When the engine 11 is located in the driving area AR1 and the engine 11 is driven, an engine control processing means of the vehicle controller 51 performs engine control processing and controls the operation of the engine 11 by a predetermined method.

Next, an electric generator target rotating speed calculation processing means of the vehicle controller 51 performs electric generator target rotating speed calculation processing and reads the rotor position θM and calculates the ring gear rotating speed NR on the basis of this rotor position θM and the gear ratio from the output shaft 26 to the ring gear R. Further, the electric generator target rotating speed calculation processing means reads the engine target rotating speed NE* determined in the engine target operating state setting processing, and calculates and determines the electric generator target rotating speed NG* by the above rotating speed relation equation on the basis of the ring gear rotating speed NR and the engine target rotating speed NE*.

When the hybrid type vehicle of the above construction runs by the drive motor 25 and the engine 11 and the electric generator rotating speed NG is low, power consumption is increased and power generation efficiency of the electric generator 16 is reduced and fuel consumption of the hybrid type vehicle correspondingly becomes worse. Therefore, when the absolute value of the electric generator target rotating speed NG* is smaller than a threshold value Nth1 (e.g., 500 [rpm]), the above fuel consumption is improved by engaging the electric generator brake B and mechanically stopping the operation of the electric generator 16.

Therefore, an electric generator brake judgment processing means of the above vehicle controller 51 performs electric generator brake judgment processing and judges whether the absolute value of the above electric generator target rotating speed NG* is the threshold value Nth1 or more. When the absolute value of the electric generator target rotating speed NG* is the threshold value Nth1 or more, the above electric generator brake judgment processing means judges whether the electric generator brake B is released. When the electric generator brake B is released, an electric generator rotating speed control processing means of the above vehicle controller 51 performs electric generator rotating speed control processing and calculates the electric generator target torque TG* on the basis of the electric generator target rotating speed NG* and the actual electric generator rotating speed NG, and controls the torque of the electric generator 16 on the basis of this electric generator target torque TG*.

Therefore, a PI control processing section 81 as a PI control processing means of the above electric generator rotating speed control processing means has a subtracter 82 as a speed deviation calculation processing means, a limiter k1, an arithmetic unit m1 as an integral term component calculation processing means, an arithmetic unit m2 as a proportional term component calculation processing means, and an adder 83 as an electric generator target torque calculation processing means. The PI control processing section 81 performs PI control processing using feedback control.

The above subtracter 82 performs speed deviation calculation processing and reads the above electric generator target rotating speed NG* and the electric generator rotating speed NG and calculates a speed deviation δNG $$\delta NG = NG^* - NG. \quad [\text{EQN. 6}]$$

Subsequently, the values of the speed deviation δNG exceeding upper and lower limit values are removed by the limiter k1 and the speed deviation δNG is then sent to the arithmetic unit m1. This arithmetic unit m1 performs integral term component calculation processing and calculates an integral term component TGi* proportional to an integral value of the above speed deviation δNG $$TGi^* = Ki \cdot \Sigma(\delta NG) \quad [\text{EQN. 7}]$$

on the basis of a gain Ki, and sends this integral term component TGi* to the adder 83.

The above speed deviation δNG is also sent to the arithmetic unit m2. This arithmetic unit m2 performs proportional term component calculation processing and calculates a proportional term component TGp*

$$TGp^* = Kp \cdot \delta NG \quad [\text{EQN. 8}]$$

on the basis of a gain Kp proportional to the above speed deviation δNG, and sends this proportional term component TGp* to the adder 83.

Subsequently, this adder 83 performs electric generator target torque calculation processing and calculates electric generator target torque TG*

$$TG^* = TGi^* + TGp^* \quad [\text{EQN. 9}]$$

by adding the integral term component TGi* and the proportional term component TGp*. The above electric generator target torque TG* is sent to an electric generator torque control processing means of the electric generator rotating speed control processing means. This electric generator torque control processing means performs electric generator torque control processing and feedback-controls the electric generator torque TG on the basis of the above electric generator target torque TG*.

When the above electric generator brake B is not released, an electric generator brake release control processing means of the above vehicle controller 51 performs electric generator brake release control processing and generates and sends an electric generator brake release request to the electric generator controller 47, and releases the electric generator brake B.

On the other hand, when the absolute value of the electric generator target rotating speed NG* is smaller than the threshold value Nth1, the above electric generator brake judgment processing means judges whether the electric generator brake B is engaged. When the electric generator brake B is not engaged, an electric generator brake engagement control processing means of the above vehicle controller 51 performs electric generator brake engagement control processing and generates and sends an electric generator brake engaging request to the electric generator controller 47 and engages the electric generator brake B.

In the hybrid type vehicle of the above construction, the engine torque TE becomes the ring gear torque TR and appears in the ring gear R and is transmitted to the drive wheel 37. An insufficient amount of the ring gear torque TR with respect to the vehicle request torque TO* is compensated by the drive motor torque TM.

Therefore, a drive motor target torque calculation processing section 85 as a drive motor target torque calculation processing means of the vehicle controller 51 performs drive motor target torque calculation processing and reads the vehicle request torque TO* and calculates the ring gear torque TR. The drive motor target torque calculation processing section 85 then converts this ring gear torque TR into a value on the output shaft 26 and determines drive shaft torque TR/OUT, and sets difference torque δTOUT that is the difference between the above output shaft request torque TOUT* and the drive shaft torque TR/OUT to drive motor target torque TM*.

Therefore, the above drive motor target torque calculation processing section 85 has an arithmetic unit m3 as an output shaft request torque calculation processing means, a drive shaft torque processing section 86 as a drive shaft torque processing means, and a subtracter 87 as a difference torque calculation processing means.

In this case, as the electric generator 16 is operated, inertia InG of the electric generator 16 affects the ring gear torque TR. Therefore, when the drive shaft torque TR/OUT is determined, an inertia correction is made and the sun gear torque TS as torque of the sun gear S is calculated by subtracting inertia torque TGI as a torque equivalent component of the amount of the inertia InG of the electric generator 16 from the electric generator target torque TG*. The drive shaft torque TR/OUT is determined on the basis of this sun gear torque TS.

However, as mentioned above, it is necessary to use the angular acceleration αG to calculate the inertia torque TGI. It is necessary to differentiate the rotor position θG twice to calculate this angular acceleration αG. When a periodic change is generated in the rotor position θG by the characteristics of the rotor position sensor 38, dispersion is generated in the calculated angular acceleration αG and an error is generated in the inertia torque TGI.

In this case, an error is also generated in the drive shaft torque TR/OUT determined on the basis of the inertia torque TGI, and an error is also generated in the drive motor target torque TM*. Accordingly, it is impossible to stably run the hybrid type vehicle.

In this embodiment, the above electric generator target torque TG* is calculated by adding the integral term component TGi* and the proportional term component TGp*. However, when the drive shaft torque TR/OUT is determined, the above integral term component TGi* is used and the drive shaft torque TR/OUT can be also determined without making the inertia correction on the basis of the integral term component TGi*.

When the electric generator 16 is located in a stable state (is not set to a transient state) and the change of the electric generator rotating speed NG is small in determining the drive shaft torque TR/OUT on the basis of the integral term component TGi*, the determined accuracy of the drive shaft torque TR/OUT can be raised. However, when the electric generator 16 is located in the transient state and the change of the electric generator rotating speed NG is large for certain reasons, the occupying ratio of the proportional term component TGp* in the electric generator target torque TG* is increased. Accordingly, the drive shaft torque TR/OUT can not be determined by following the change of the electric generator rotating speed NG, and the appropriate drive motor target torque TM* can not be generated.

Therefore, a first determination mode for determining the drive shaft torque TR/OUT by making the inertia correction and a second determination mode for determining the drive shaft torque TR/OUT on the basis of the integral term component TGi* are switched. When the change of the electric generator rotating speed NG is large, the drive shaft torque TR/OUT is determined in the first determination mode. In contrast to this, when the change of the electric generator rotating speed NG is small, the drive shaft torque TR/OUT is determined in the second determination mode.

Therefore, a determination mode switching condition judgment processing means of the above vehicle controller 51 performs determination mode switching condition judgment processing and judges whether first and second switching conditions exist. When the first switching condition exists, a switching flag Fg is turned on. When the second switching condition exists, the switching flag Fg is turned off.

In this case, the determining mode switching condition judgment processing means judges that the first switching condition exists when a request for operating and stopping various kinds of mechanical portions of e.g., the engine 11, the air conditioner, the electric generator brake B, etc., is generated as an event forming a factor for changing the electric generator rotating speed NG.

Namely, for example, whether an engine starting request is generated to start the engine 11 is set as a first judging condition. Whether an engine stopping request is generated to stop the operation of the engine 11 is set as a second judging condition. Whether an electromagnetic clutch engaging request for operating the air conditioner is generated is set as a third judging condition. Whether an electromagnetic clutch release request is generated is set as a fourth judging condition. Whether an electric generator brake engaging request is generated is set as a fifth judging condition. Whether an electric generator brake release request is generated is set as a sixth judging condition. At this time, when at least one of the first to sixth judging conditions exists, the determining mode switching condition judgment processing means judges that the first switching condition exists, and turns on the switching flag Fg.

The above determining mode switching condition judgment processing means also judges that the second switching condition exists when the electric generator rotating speed NG is stabilized.

Namely, for example, whether the change of the engine target torque TE*, the engine target rotating speed NE* or the electric generator target rotating speed NG* is reduced and the engine target torque TE*, the engine target rotating speed NE* or the electric generator target rotating speed NG* is stabilized, is set as a seventh judging condition. Whether the engine target rotating speed NE* becomes about zero (0) is set as an eighth judging condition. Whether the engine target rotating speed NE* is stabilized is set as ninth and tenth judging conditions. Whether a setting time has passed after termination of the engagement of the electric generator brake B, or the engine target torque TE* is stabilized is set as an eleventh judging condition. Whether a setting time has passed after termination of the release of the electric generator brake B, or the engine target torque TE* is stabilized is set as a twelfth judging condition. At this time, the determining mode switching condition judgment processing means judges that the second switching condition exists, and turns off the switching flag Fg.

The above drive shaft torque determination processing section 86 then determines the drive shaft torque TR/OUT by switching the determining modes on the basis of the turning on and off of the above switching flag Fg.

Therefore, the above drive shaft torque determination processing section 86 has determining sections 89, 91 as first and second determination processing means and a selector 92 as a determining value selection processing means. The above determining section 89 has an arithmetic unit m5 as an inertia torque calculation processing means, a subtracter 93 as a sun gear torque calculation processing means, and an arithmetic unit m6 as a first determining value calculation processing means. The above determining section 91 has an arithmetic unit m7 as a second determining value calculation processing means.

The above selector 92 has a switching flag judgment processing means and a selecting switch MSW. The above switching flag judgment processing means performs switching flag judgment processing and reads the switching flag Fg and judges whether the switching flag Fg is on. When the switching flag Fg is on, the above selecting switch MSW selects the first determining mode and selects an inertia correction determining value TR1 as a first determining value calculated in the determining section 89, and sends this inertia correction determining value TR1 to the subtracter 87 as the drive shaft torque TR/OUT.

Therefore, in the above determining section 89, the above electric generator target torque TG* and the angular acceleration αG are read and the above electric generator target torque TG* is approximately set to the electric generator torque TG. This electric generator torque TG is converted into a value on the ring gear R on the basis of the above torque relation equation, and the ring gear torque TR is calculated.

Namely, when the inertia of the electric generator 16 is set to InG, the above arithmetic unit m5 performs inertia torque calculation processing and calculates inertia torque TGI of the amount of the above inertia InG $$TGI = InG \cdot \alpha G \quad [EQN.\ 10]$$

and sends this inertia torque TGI to the subtracter 93. This subtracter 93 performs sun gear torque calculation processing and calculates the sun gear torque TS by subtracting the above inertia torque TGI from the electric generator torque TG as shown by the following EQN. 11.

$$TS = TG^* - TGI = TG^* - InG \cdot \alpha G \quad [EQN.\ 11]$$

Subsequently, the arithmetic unit m6 performs first determining value calculation processing and calculates the ring gear torque TR $$\begin{aligned} TR &= \rho \cdot TS \\ &= \rho \cdot (TG^* - TGI) \\ &= \rho \cdot (TG^* - InG \cdot \alpha G) \end{aligned} \quad [EQN.\ 12]$$

on the basis of the above torque relation equation. Subsequently, the above arithmetic unit m6 converts the ring gear torque TR into torque on the output shaft 26 on the basis of the gear ratio from the output shaft 14 to the output shaft 26, and calculates the inertia correction determining value TR1.

When the engine rotating speed NE is constant, the above inertia torque TGI normally has a negative value with respect to an accelerating direction during the acceleration of the hybrid type vehicle, and has a positive value with respect to the accelerating direction during deceleration of the hybrid type vehicle.

On the other hand, when the switching flag Fg is off, the above selecting switch MSW selects the second determining mode and selects an integral term correction determining value TR2 calculated in the determining section 91 and sends this integral term correction determining value TR2 to the subtracter 87 as the drive shaft torque TR/OUT.

Therefore, in the determining section 91, the arithmetic unit m7 performs second determining value calculation processing, and reads the above integral term component TGi*. The arithmetic unit m7 then converts the integral term component TGi* into a value on the ring gear R on the basis of the above torque relation equation and calculates the ring gear torque TR $$TR = \rho \cdot TGi^* \quad [EQN.\ 13]$$

Subsequently, the above arithmetic unit m7 converts the ring gear torque TR into torque on the output shaft 26 on the basis of the gear ratio from the output shaft 14 to the output shaft 26 and calculates an integral term correction determining value TR2.

Thus, when the drive shaft torque TR/OUT is determined in the drive shaft torque determination processing section 86 and is sent to the subtracter 87, the subtracter 87 performs difference torque calculation processing and calculates the difference torque δTOUT as mentioned above and determines this difference torque δTOUT as the drive motor target torque TM*.

Subsequently, the above vehicle controller 51 sends the determined drive motor target torque TM* to the drive motor controller 49. The above drive motor control processing means then performs the drive motor control processing and controls the drive motor torque TM by controlling the torque of the drive motor 25 on the basis of the above drive motor target torque TM*.

Since the electric generator target torque TG* is set to zero in engaging the electric generator brake B, the ring gear torque TR has a proportional relation to the engine torque TE. Therefore, when the electric generator brake B is engaged, the above drive motor target torque calculation processing section 85 reads the engine torque TE and calculates the ring gear torque TR on the basis of the engine torque TE by the above torque relation equation. The above drive motor target torque calculation processing section 85 then converts this ring gear torque TR into torque on the output shaft 26 on the basis of the gear ratio from the output shaft 14 to the output shaft 26, and determines the above drive shaft torque TR/OUT.

Thus, in this embodiment, while the electric generator 16 is located in a stable state, the drive shaft torque TR/OUT is determined on the basis of the integral term component TGi* of the electric generator target torque TG*. Accordingly, even when a periodic change is generated in the rotor position θG by the characteristics of the rotor position sensor 38, no error is generated in the drive shaft torque TR/OUT. Therefore, no error is generated in the drive motor target torque TM*. Hence, it is possible to stably run the hybrid type vehicle.

Further, when the electric generator 16 is located in the transient state, the inertia correction is made with respect to the electric generator target torque TG* and the drive shaft torque TR/OUT is determined. Accordingly, even when the change of the electric generator rotating speed NG is large, the drive shaft torque TR/OUT can be determined by following the change of the electric generator rotating speed NG and appropriate drive motor target torque TM* can be generated.

Further, it is judged that the first switching condition exists when a request for operating and stopping various kinds of mechanical portions of e.g., the engine 11, the air conditioner, the electric generator brake B, etc., is generated as an event forming a factor for changing the electric generator rotating speed NG. Accordingly, the determining modes can be switched before the electric generator rotating speed NG actually begins to be changed. Hence, further appropriate drive motor target torque TM* can be generated.

As the event forming the factor for changing the electric generator rotating speed NG, it is possible to judge that the first switching condition exists, e.g., when the change δNE* of the engine target rotating speed NE* is greater than a threshold value δNE*th, when the change δTE* of the engine target torque TE* is greater than a threshold value δTE*th, etc. It is also possible to judge that the first switching condition exists when the change δNG* of the electric generator target rotating speed NG* is greater than a threshold value δNG*th, when the change δTG* of the electric generator target torque TG* is greater than a threshold value δTG*th, etc. Further, in these cases, other threshold values are set in the changes δNE*, δTE*, δNG* and δTG* to judge whether the second switching condition exists.

The flow charts of FIGS. 7 to 9 will next be explained.

Step S1: Initialization processing is performed.

Step S2: The accelerator pedal position AP and the brake pedal position BP are read.

Step S3: The vehicle speed V is calculated.

Step S4: The vehicle request torque TO* is determined.

Step S5: It is judged whether the output shaft request torque TOUT* is greater than the drive motor maximum torque TMmax. When the output shaft request torque TOUT* is greater than the drive motor maximum torque TMmax, it proceeds to a step S6. In contrast to this, when the output shaft request torque TOUT* is the drive motor maximum torque TMmax or less, it proceeds to a step S8.

Step S6: It is judged whether the operation of the engine 11 is being stopped. When the operation of the engine 11 is being stopped, it proceeds to a step S7. In contrast to this, when the operation of the engine 11 is not being stopped (the engine 11 is being driven), it proceeds to a step S8.

Step S7: The sudden acceleration control processing is performed.

Step S8: The driver request output PD is calculated.

Step S9: The battery charge-discharge request output PB is calculated.

Step S10: The vehicle request output PO is calculated.

Step S11: The operating point of the engine 11 is determined.

Step S12: It is judged whether the engine 11 is located in the driving area AR1. When the engine 11 is located in the driving area AR1, it proceeds to a step S13. In contrast to this, when the engine 11 is not located in the driving area AR1, it proceeds to a step S14.

Step S13: It is judged whether the engine 11 is driven. When the engine 11 is driven, it proceeds to a step S17. In contrast to this, when the engine 11 is not driven, it proceeds to a step S15.

Step S14: It is judged whether the engine 11 is driven. When the engine 11 is driven, it proceeds to a step S16. In contrast to this, when the engine 11 is not driven, it proceeds to a step S27.

Step S15: The engine starting control processing is performed.

Step S16: The engine stopping control processing is performed.

Step S17: The engine control processing is performed.

Step S18: The electric generator target rotating speed NG* is determined.

Step S19: It is judged whether the absolute value of the electric generator target rotating speed NG* is the threshold value Nth1 or more. When the absolute value of the electric generator target rotating speed NG* is the threshold value Nth1 or more, it proceeds to a step S20. In contrast to this, when the absolute value of the electric generator target rotating speed NG* is smaller than the threshold value Nth1, it proceeds to a step S21.

Step S20: It is judged whether the electric generator brake B is released. When the electric generator brake B is released, it proceeds to a step S23. In contrast to this, when the electric generator brake B is not released, it proceeds to a step S24.

Step S21: It is judged whether the electric generator brake B is engaged. When the electric generator brake B is engaged, the processing is terminated. In contrast to this, when the electric generator brake B is not engaged (is released), it proceeds to a step S22.

Step S22: The electric generator brake engaging control processing is performed.

Step S23: The electric generator rotating speed control processing is performed.

Step S24: The electric generator brake release control processing is performed.

Step S25: The determining mode switching condition judgment processing is performed.

Step S26: The drive shaft torque determination processing is performed.

Step S27: The drive motor target torque TM* is determined.

Step S28: The drive motor control processing is performed and the processing is terminated.

The flow chart of FIG. 14 will next be explained.

Step S23-1: The electric generator target rotating speed NG* is read.

Step S23-2: The electric generator rotating speed NG is read.

Step S23-3: The electric generator target torque TG* is calculated.

Step S23-4: The electric generator torque control processing is performed and it is returned.

The flow chart of FIG. 15 will next be explained.

Step S26-1: The switching flag Fg is read.

FIG. 26-2 It is judged whether the switching flag Fg is on. When the switching flag Fg is on, it proceeds to a step S26-5. When the switching flag Fg is not on (is off), it proceeds to a step S26-3.

Step S26-3: The integral term component TGi* is read.

Step S26-4: The integral term correction determining value TR2 is calculated.

Step S26-5: The electric generator target torque TG* and the angular acceleration αG are read.

Step S26-6: The inertia correction determining value TR1 is calculated.

Step S26-7: The drive shaft torque TR/OUT is determined and it is returned.

Next, the operation of the electrically operated vehicle drive controller will be explained when the hybrid type vehicle runs at a constant vehicle speed V, and a driver raises the engine rotating speed NE by stepping-in the accelerator pedal 54, and subsequently reduces the engine rotating speed NE by relaxing the accelerator pedal 54 from a state in which the vehicle request torque TO* and the engine torque TE are constantly set.

Figure 16:
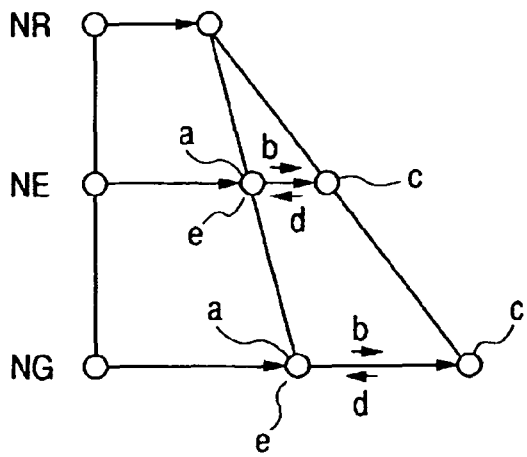
FIG. 16 is a speed diagram showing states of the hybrid type vehicle in the embodiment of the present invention.
Figure 17:
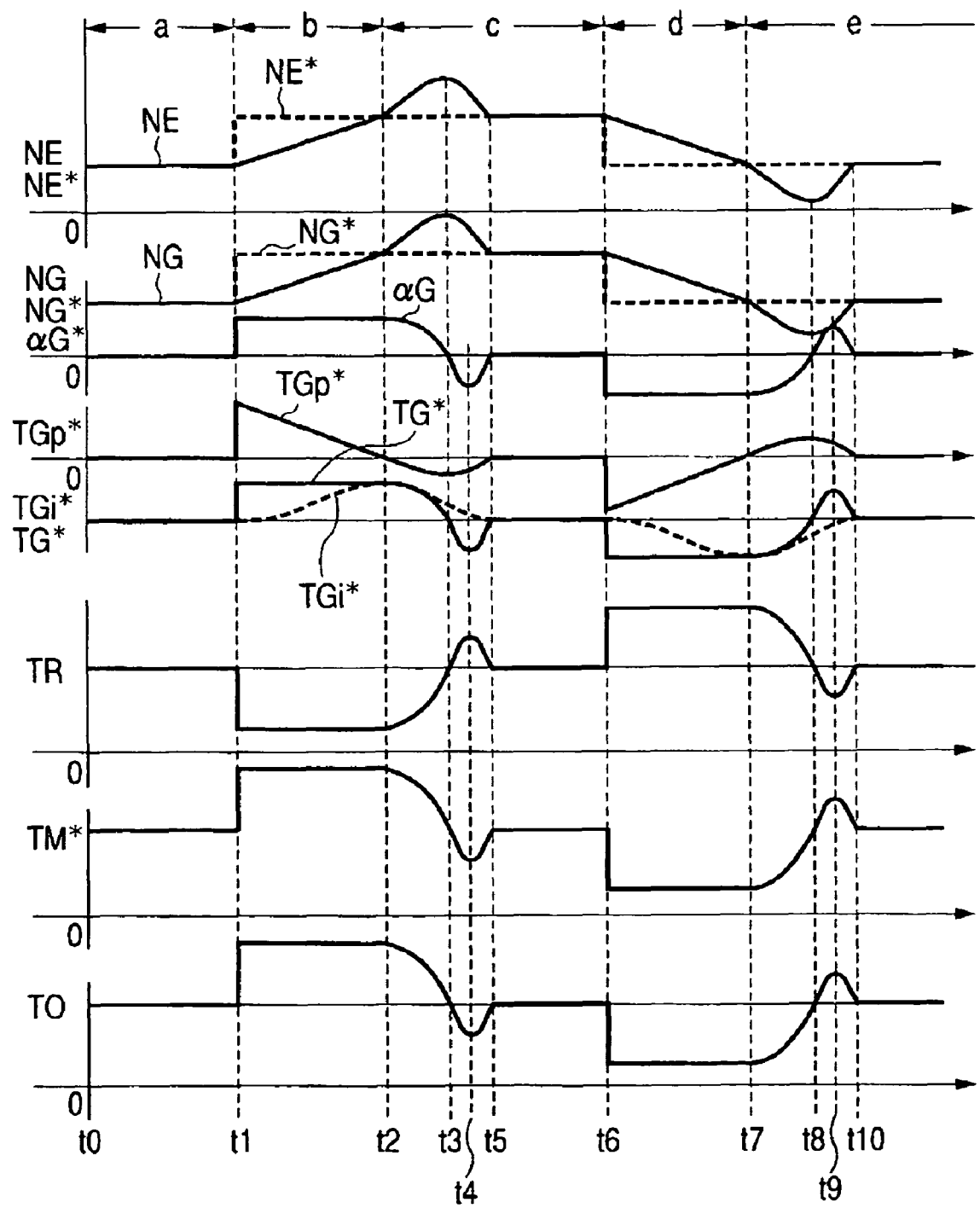
FIG. 17 is a time chart showing the operation of a conventional electrically operated vehicle drive controller.
Figure 18:
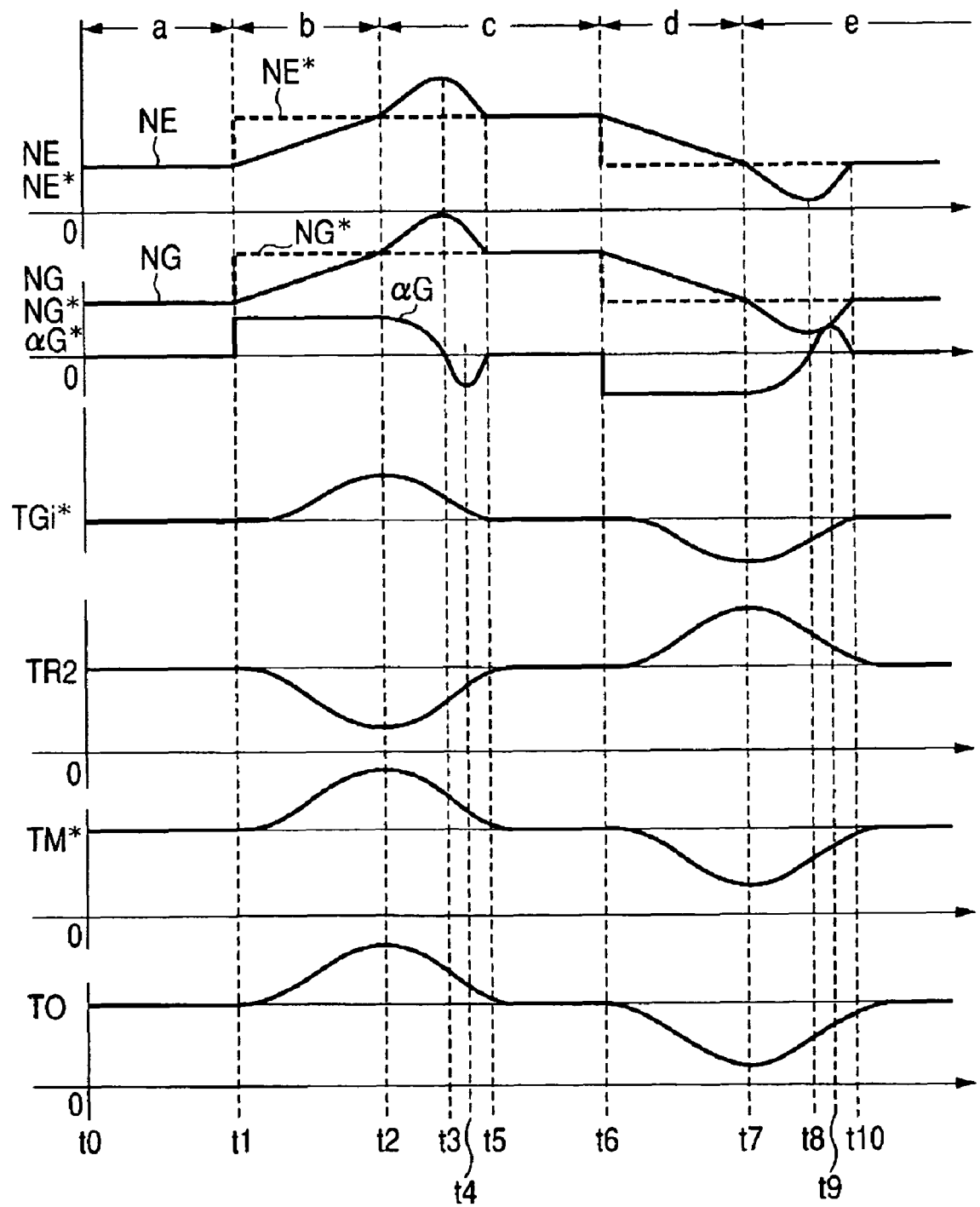
FIG. 18 is a time chart showing the operation of the electrically operated vehicle drive controller in the embodiment of the present invention.

FIG. 16 is a speed diagram showing states of the hybrid type vehicle in the embodiment of the present invention. FIG. 17 is a time chart showing the operation of a conventional electrically operated vehicle drive controller. FIG. 18 is a time chart showing the operation of the electrically operated vehicle drive controller in the embodiment of the present invention.

In these figures, reference numerals a to e designate states of the hybrid type vehicle. As shown in FIG. 17, when the hybrid type vehicle is located in the state a in timing t0, the vehicle request torque TO* is constantly set and the engine 11 is driven at a constant engine rotating speed NE and the electric generator 16 is operated at a constant electric generator rotating speed NG. At this time, the electric generator target torque TG* and the drive motor target torque TM* are set to predetermined initial values. The drive torque TO outputted to the drive wheel 37 (FIG. 6) has a constant value.

Next, when an electromagnetic clutch engaging request for operating the air conditioner is generated in timing t1, the hybrid type vehicle is located in the state b and the engine target rotating speed NE* is raised. As the engine target rotating speed NE* is raised, the electric generator target rotating speed NG* is raised and the engine rotating speed NE and the electric generator rotating speed NG are gradually raised. At this time, the angular acceleration αG of the electric generator 16 has a constant positive value.

Subsequently, in timing t2, the engine rotating speed NE and the engine target rotating speed NE* become equal to each other, and the electric generator rotating speed NG and the electric generator target rotating speed NG* become equal to each other. When the hybrid type vehicle is located in the state c, the engine rotating speed NE is then gradually continuously raised by the inertia of the engine 11 and the electric generator rotating speed NG is gradually continuously raised by the inertia InG of the electric generator 16 so that these rotating speeds are overshot. In timing t3, the engine rotating speed NE and the electric generator rotating speed NG reach maximum values and are subsequently gradually reduced. In timing t5, the engine rotating speed NE becomes equal to the engine target rotating speed NE*, and the electric generator rotating speed NG becomes equal to the electric generator target rotating speed NG*.

Further, the above angular acceleration αG is gradually reduced from the timing t2 and becomes zero in the timing t3 and is then raised in the negative direction. In timing t4, the angular acceleration αG reaches a maximum value in the negative direction and is subsequently gradually reduced in the negative direction. In the timing t5, the angular acceleration αG again becomes zero.

Next, when the electromagnetic clutch release request is generated in timing t6, the hybrid type vehicle is located in the state d, and the engine target rotating speed NE* is reduced. As the engine target rotating speed NE* is reduced, the electric generator target rotating speed NG* is reduced and the engine rotating speed NE and the electric generator rotating speed NG are gradually reduced. Further, the angular acceleration αG has a negative value.

Subsequently, in timing t7, the engine rotating speed NE and the engine target rotating speed NE* become equal to each other, and the electric generator rotating speed NG and the electric generator target rotating speed NG* become equal to each other. When the hybrid type vehicle is located in the state e, the engine rotating speed NE is then gradually continuously reduced by the inertia of the engine 11 and the electric generator rotating speed NG is gradually continuously reduced by the inertia InG of the electric generator 16 so that these rotating speeds are overshot. In timing t8, the engine rotating speed NE and the electric generator rotating speed NG reach minimum values and are subsequently gradually raised. In timing t9, the engine rotating speed NE becomes equal to the engine target rotating speed NE*, and the electric generator rotating speed NG becomes equal to the electric generator target rotating speed NG*.

The angular acceleration αG is reduced from the timing t7 in the negative direction. After the angular acceleration αG becomes zero in the timing t8, the angular acceleration αG is gradually raised and reaches a maximum value in the timing t9. Subsequently, the angular acceleration αG is gradually reduced and again becomes zero in timing t10.

In the conventional electrically operated vehicle drive controller, the integral term component TGi* and the proportional term component TGp* are calculated on the basis of the speed deviation δNG, and the electric generator target torque TG* is calculated by adding the integral term component TGi* and the proportional term component TGp*. Further, the ring gear torque TR is calculated on the basis of the electric generator target torque TG* and the inertia torque TGI.

Accordingly, in timings t1 to t2, the integral term component TGi* is gradually increased from a predetermined value and reaches a maximum value, and the proportional term component TGp* is gradually reduced from a maximum value and becomes zero. Accordingly, the electric generator target torque TG* approximately becomes constant in the timings t1 to t2. In timings t2 to t5, the integral term component TGi* is gradually reduced from the maximum value and becomes a predetermined value. The proportional term component TGp* is gradually increased in the negative direction in timings t2 to t3 and reaches a maximum value. In timings t3 to t5, the proportional term component TGp* is gradually reduced in the negative direction and becomes zero. Accordingly, the electric generator target torque TG* is gradually reduced in the timings t2 to t3 and becomes a predetermined value. In timings t3 to t4, the electric generator target torque TG* is gradually increased in the negative direction and reaches a maximum value. In timings t4 to t5, the electric generator target torque TG* is gradually reduced in the negative direction and becomes a predetermined value.

Further, in timings t6 to t7, the integral term component TGi* is gradually increased from the predetermined value in the negative direction and reaches a maximum value, and the proportional term component TGp* is gradually reduced from the maximum value in the negative direction and becomes a predetermined value. Accordingly, in the timings t6 to t7, the electric generator target torque TG* approximately becomes constant. In timings t7 to t10, the integral term component TGi* is gradually reduced from the maximum value in the negative direction and becomes a predetermined value. The proportional term component TGp* is gradually increased in timings t7 to t8 and reaches a maximum value, and is gradually reduced in timings t8 to t10 and becomes zero. The electric generator target torque TG* is gradually reduced in the negative direction in the timings t7 to t8 and becomes zero. In timings t8 to t9, the electric generator target torque TG* is gradually increased and reaches a maximum value. In timings t9 to t10, the electric generator target torque TG* is gradually reduced and becomes a predetermined value.

The ring gear torque TR is generated on the basis of the above electric generator target torque TG* and the drive shaft torque TR/OUT is determined on the basis of this ring gear torque TR, and the drive motor target torque TM* is generated. As its result, the drive torque TO is outputted to the drive wheel 37. In this case, each of the ring gear torque TR, the drive motor target torque TM* and the drive torque TO is changed in the same pattern as the electric generator target torque TG*, or a pattern inverted in positive and negative.

In contrast to this, in this embodiment, the integral term component TGi* is calculated on the basis of the speed deviation δNG between the electric generator target rotating speed NG* and the electric generator rotating speed NG in a transient state of the electric generator 16, and the integral term correction determining value TR2 is calculated on the basis of the integral term component TGi*.

Accordingly, the integral term component TGi* is gradually increased from zero in timings t1 to t2 and reaches a maximum value. In timings t2 to t5, the integral term component TGi* is gradually reduced from the maximum value and becomes zero. In timings t6 to t7, the integral term component TGi* is gradually increased from zero in the negative direction and becomes a maximum value. In timings t7 to t10, the integral term component TGi* is gradually reduced from the maximum value in the negative direction and becomes zero.

Then, the integral term correction determining value TR2 is generated on the basis of the above integral term component TGi* and the drive shaft torque TR/OUT is determined on the basis of this integral term correction determining value TR2, and the drive motor target torque TM* is generated. As a result, when the drive torque TO is outputted to the drive wheel 37, each of the integral term correction determining value TR2, the drive motor target torque TM* and the drive torque TO is changed in the same pattern as the electric generator target torque TG*, or the pattern inverted in positive and negative.

The present invention is not limited to the above embodiments, but can be modified in various ways on the basis of the gist of the present invention, and these modifications are not excluded from the scope of the present invention.

What is claimed is:

1. An electrically operated vehicle drive controller comprising:
   a differential rotating device comprising:
      a first differential element,
      a second differential element and
      a third differential element,
         wherein the first differential element is mechanically connected to an electric generator and
         wherein the second differential element is mechanically connected to a drive motor and a drive wheel and
         wherein the third differential element is mechanically connected to an engine,
   electric generator target torque calculation processing means for calculating an electric generator target torque of said electric generator by feedback control for performing at least proportional control and integral control so that an electric generator rotating speed of said electric generator becomes an electric generator target rotating speed of said electric generator determined on the basis of an engine target rotating speed of the engine;
   determination processing means for calculating an integral term correction determining value based on an integral term component of the electric generator target torque in said integral control of the electric generator target torque calculation processing means;
   drive motor target torque calculation processing means for calculating a drive motor target torque based on said integral term correction determining value;
   electric generator torque control processing means for feedback-controlling the electric generator torque based on the electric generator target torque; and
   drive motor control processing means for controlling the drive motor toque based on the drive motor target torque;
   wherein said electric generator target torque calculation processing means calculates the electric generator target torque based on a speed deviation between the electric generator rotating speed detected by a rotating speed detecting section and the electric generator target rotating speed;
   wherein said electric generator target torque is calculated by adding at least a proportional term component proportional to said speed deviation by the proportional control, and the integral term component proportional to an integral value of said speed deviation by the integral control.

2. An electrically operated vehicle drive control method comprising:
   calculating an electric generator target torque of an electric generator by feedback control for performing at least proportional control and integral control so that an electric generator rotating speed of said electric generator becomes an electric generator target rotating speed of said electric generator determined on the basis of an engine target rotating speed of an engine;
   calculating the electric generator target torque based on a speed deviation between the electric generator rotating speed detected by a rotating speed detecting section and the electric generator target rotating speed;
   wherein said electric generator target torque is calculated by adding at least a proportional term component proportional to said speed deviation by the proportional control, and the integral term component proportional to an integral value of said speed deviation by the integral control;
   calculating an integral term correction determining value based on an integral term component of the electric generator target torque in said integral control;
   calculating a drive motor target torque based on the integral term correction determining value;
   feedback controlling torque of the electric generator on the electric generator target torque; and
   controlling torque of a drive motor based on the drive motor target torque.

3. A computer-readable recording medium encoded with a program which causes a computer to provide a service of electrically operated vehicle drive control, the service comprising:
   calculating an electric generator target torque of an electric generator by feedback control for performing at least proportional control and integral control so that an electric generator rotating speed of said electric generator becomes an electric generator target rotating speed of said electric generator determined on the basis of an engine target rotating speed of an engine;
   calculating the electric generator target torque based on a speed deviation between the electric generator rotating speed detected by a rotating speed detecting section and the electric generator target rotating speed;
   wherein said electric generator target torque is calculated by adding at least a proportional term component proportional to said speed deviation by the proportional control, and the integral term component proportional to an integral value of said speed deviation by the integral control;
   calculating an integral term correction determining value based on an integral term component of the electric generator target torque in said integral control; and
   calculating a drive motor target torque based on said integral term correction determining value;
   feedback controlling torque of the electric generator on the electric generator target torque; and
   controlling torque of a drive motor based on the drive motor target torque.

* * * * *